US008982084B2

(12) United States Patent
Christiansson et al.

(10) Patent No.: US 8,982,084 B2
(45) Date of Patent: Mar. 17, 2015

(54) TRACKING OBJECTS ON A TOUCH SURFACE

(71) Applicants: Tomas Christiansson, Torna-Hallestad (SE); Nicklas Ohlsson, Bunkeflostrand (SE); Andreas Bjorklund, Lund (SE); Mats Petter Wallander, Lund (SE)

(72) Inventors: Tomas Christiansson, Torna-Hallestad (SE); Nicklas Ohlsson, Bunkeflostrand (SE); Andreas Bjorklund, Lund (SE); Mats Petter Wallander, Lund (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 14/004,323

(22) PCT Filed: Dec. 10, 2012

(86) PCT No.: PCT/SE2012/051369
§ 371 (c)(1),
(2) Date: Sep. 10, 2013

(87) PCT Pub. No.: WO2013/089623
PCT Pub. Date: Jun. 20, 2013

(65) Prior Publication Data
US 2014/0055421 A1 Feb. 27, 2014

Related U.S. Application Data

(60) Provisional application No. 61/576,458, filed on Dec. 16, 2011.

(30) Foreign Application Priority Data

Dec. 16, 2011 (SE) ...................................... 1151209

(51) Int. Cl.
*G06F 3/041* (2006.01)
*G06F 3/042* (2006.01)

(52) U.S. Cl.
CPC ............ *G06F 3/0418* (2013.01); *G06F 3/0421* (2013.01); *G06F 2203/04109* (2013.01)
USPC ......................................................... 345/173

(58) Field of Classification Search
None
See application file for complete search history.

(56) References Cited

U.S. PATENT DOCUMENTS 6,972,753 B1 12/2005 Kimura et al.
7,432,893 B2 10/2008 Ma et al.
(Continued)

FOREIGN PATENT DOCUMENTS

WO WO-2009/048365 A1 4/2009
WO WO-2009/077962 A2 6/2009
(Continued)

OTHER PUBLICATIONS

Written Opinion issued in International Application No. PCT/SE2012/051369, dated Jul. 12, 2013.
(Continued)

*Primary Examiner* — Adam R Giesy
(74) *Attorney, Agent, or Firm* — Harness, Dickey & Pierce, P.L.C.

(57) ABSTRACT

A device implements a method of tracking objects on a touch surface of an FTIR based touch-sensitive apparatus. The method repeatedly operates to generate an interaction pattern that indicates local changes in interaction on the touch surface, identify apparent peaks in the interaction pattern, and update existing movement trajectories based on the apparent peaks. An error suppression process is executed at least intermittently in the method to process the apparent peaks and/or the existing movement trajectories to identify implicated trajectories with a potential tracking problem, define two or more movement propositions for each implicated trajectory, and cause an evaluation of the movement propositions in one or more subsequent repetitions of the method. The error suppression process improves tracking by postponing the final decision on how to track the object of the implicated trajectory until more information is available.

20 Claims, 11 Drawing Sheets

(56) References Cited

U.S. PATENT DOCUMENTS

| | | |
|---|---|---|
| 2006/0114237 A1 | 6/2006 | Crockett et al. |
| 2007/0075648 A1 | 4/2007 | Blythe et al. |
| 2010/0245292 A1 | 9/2010 | Wu |
| 2012/0188206 A1* | 7/2012 | Sparf et al. .................... 345/175 |

FOREIGN PATENT DOCUMENTS

| | | |
|---|---|---|
| WO | WO-2009/137355 A2 | 11/2009 |
| WO | WO-2010/006882 A2 | 1/2010 |
| WO | WO-2010/006883 A2 | 1/2010 |
| WO | WO-2010/006884 A2 | 1/2010 |
| WO | WO-2010/006885 A2 | 1/2010 |
| WO | WO-2010/006886 A2 | 1/2010 |
| WO | WO-2010/064983 A2 | 6/2010 |
| WO | WO-2010/134865 A1 | 11/2010 |
| WO | WO-2011/028169 A1 | 3/2011 |
| WO | WO-2011/049511 A1 | 4/2011 |
| WO | WO-2011/049512 A1 | 4/2011 |
| WO | WO-2011/139213 A1 | 11/2011 |
| WO | WO-2012/050510 A1 | 4/2012 |
| WO | WO-2013/048312 A2 | 4/2013 |
| WO | WO-2013/055282 A2 | 4/2013 |

OTHER PUBLICATIONS

International Search Report issued in International Application No. PCT/SE2012/051369, dated Jul. 12, 2013.

* cited by examiner

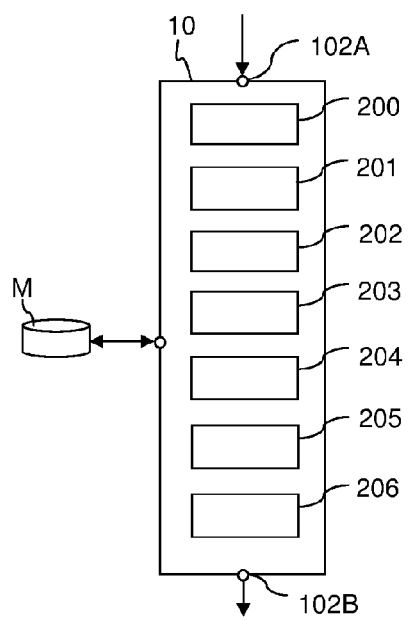
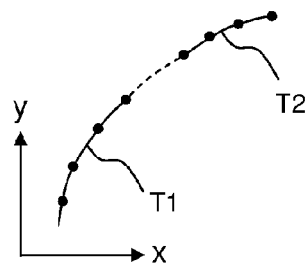
Fig. 5B
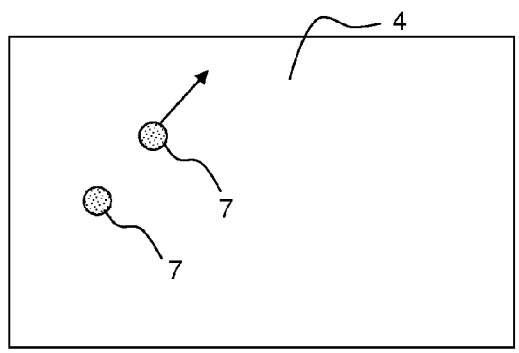
Fig. 6A  Fig. 6B
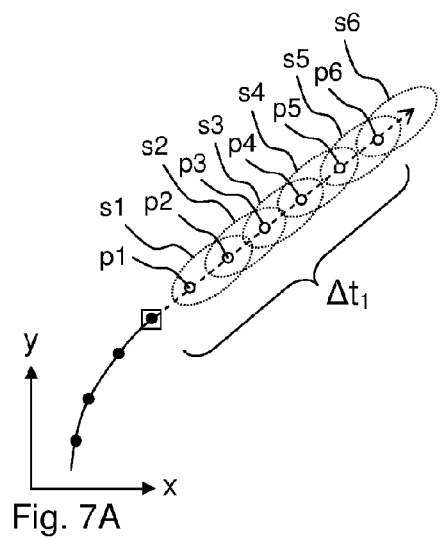
Fig. 7A
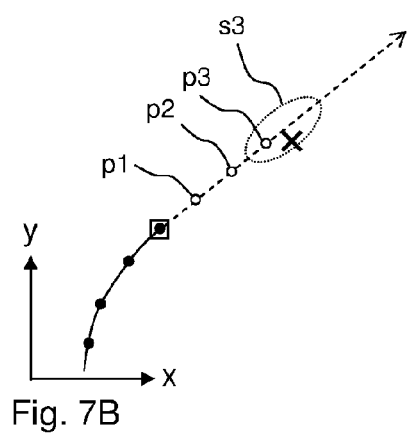
Fig. 7B

TRACKING OBJECTS ON A TOUCH SURFACE

CROSS-REFERENCE TO RELATED APPLICATIONS

This application is the national phase under 35 U.S.C. §371 of PCT International Application No. PCT/SE2012/051369 which has an International filing date of Dec. 10, 2012, which designated Sweden and which claims priority to Swedish patent application number SE 1151209-2 filed Dec. 16, 2011 and U.S. provisional patent application No. 61/576,458 filed Dec. 16, 2011.

TECHNICAL FIELD

The present invention relates to techniques for tracking objects on a touch surface, in particular a touch surface of a touch-sensitive apparatus that operates by propagating light inside a light transmissive panel from a plurality of incoupling points to a plurality of outcoupling points so as to illuminate the touch surface from within the panel.

BACKGROUND ART

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2011/028169 and WO2011/049512 disclose multi-touch systems that are based on frustrated total internal reflection (FTIR). Light sheets are coupled into a panel to propagate inside the panel by total internal reflection (TIR). When an object comes into contact with a touch surface of the panel, the propagating light is attenuated at the point of touch. The transmitted light is measured at a plurality of outcoupling points by one or more light sensors. The signals from the light sensors are processed for input into an image reconstruction algorithm that generates a 2D representation of interaction across the touch surface. This enables repeated determination of current position/size/shape of touches in the 2D representation while one or more users interact with the touch surface.

The touches need to be detected in the presence of interferences, such as measurement noise, ambient light, contamination on the touch surface (e.g. fingerprints and other types of smear), vibrations, etc. These interferences may vary not only over time but also across the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users.

The combination of several touches, complex gestures as well as temporal and spatial variations of interaction and interferences will make the identification of touches a demanding task. The user experience may be hampered if, e.g., an ongoing gesture on a touch screen is interrupted by the system failing to detect certain touches during the gesture.

The above-mentioned WO2011/028169 and WO2011/049512 propose different techniques to suppress the influence of contamination, e.g. by compensating the 2D representation by an intermittently updated 2D background status that estimates the interaction caused by contamination, or by normalizing the measurement signals by reference values that are intermittently updated to represent the influence of contamination. To the extent that such a suppression is incomplete, or other types of interferences are present, the 2D representation may still contain false peaks that are mistaken for touching objects.

The prior art also comprises WO2010/006883 which discloses a technique for touch determination in an optical multi-touch system, where attenuated light paths are identified and processed for determining a set of candidate touches, which may include true touches as well as ghost touches. The candidate positions are then validated based the shape and/or area of each candidate touch, allowing the ghost touches to be identified and eliminated from further processing.

The present Applicant has identified a need for an improved technique of tracking objects on the touch surface in the presence of interferences.

SUMMARY

It is an objective of the invention to at least partly overcome one or more of the above-identified limitations of the prior art.

Another objective is to enable tracking of objects on a touch surface of a multi-touch system that operates by FTIR.

A further objective is to enable such tracking based on a 2D representation of interaction on a touch surface, even if the 2D representation contains peaks caused by interferences.

One or more of these objectives, as well as further objectives that may appear from the description below, are at least partly achieved by means of a method, a computer program product, a device and a touch-sensitive apparatus according to the independent claims, embodiments thereof being defined by the dependent claims.

A first aspect of the invention is a method of tracking movement of one or more objects on a touch surface of a touch-sensitive apparatus. The touch-sensitive apparatus is operable to propagate light by internal reflections inside a light transmissive panel from a plurality of incoupling points to a plurality of outcoupling points so as to illuminate the touch surface from within the light transmissive panel, wherein at least one light detector is optically coupled to the outcoupling points to generate an output signal representing received light at the outcoupling points. The method operates in a time sequence of repetitions, each repetition comprising: processing the output signal to generate an interaction pattern that indicates local changes in interaction on the touch surface; processing the interaction pattern for identification of apparent peaks; and updating, based on the apparent peaks, existing movement trajectories of objects deemed to exist on the touch surface in a preceding repetition. The method further comprises an error suppression process which is executed at least intermittently in said time sequence of repetitions and which comprises: processing the apparent peaks and/or the existing movement trajectories to identify implicated trajectories with a potential tracking problem; defining at least two movement propositions for each implicated trajectory; and causing an evaluation of said at least two movement propositions in one or more subsequent repetitions.

By virtue of the error suppression process, the method of the first aspect is given an improved ability to track objects on a touch surface of a multi-touch system that operates by FTIR. The error suppression process, which is designed to identify and handle potential tracking problems, defines different movement propositions for an implicated trajectory or trace. Each movement proposition represents a hypothetical movement of the implicated trajectory over the forthcoming repetitions. Thereby, the movement propositions may be evaluated with respect to the apparent peaks that are detected in subsequent repetitions, allowing the final decision on how to track the object of the implicated trajectory to be postponed. This will improve tracking since it allows the final decision to be taken on more information. Furthermore, it allows the origin of the tracking problem to subside and/or the object to move away from an area on the touch surface that exhibits interferences.

Generally, the at least two movement propositions may be defined based on a classification of the potential tracking problem and/or based on a movement characteristic of the implicated trajectory during preceding repetitions. Thus, different types of potential tracking problems may lead to different movement propositions being defined in the step of defining. Likewise, the recent movement characteristic (speed, acceleration, etc) of the implicated trajectory lead to different movement propositions being defined in the step of defining.

In one embodiment, the evaluation results in a selection of one of said at least two movement propositions for each implicated trajectory. Furthermore, the step of updating the existing movement trajectories may comprise a step of updating each implicated trajectory based on the selection.

In one embodiment, the implicated trajectories are identified by processing the apparent peaks to identify potentially false peaks, and mapping the potentially false peaks to the existing movement trajectories.

In one embodiment, said at least two movement propositions comprise a first proposition that the object corresponding to the implicated trajectory is stationary, and a second proposition that the object corresponding to the implicated trajectory is moving.

In one embodiment, said at least two movement propositions comprise a first proposition that the object corresponding to the implicated trajectory is removed from the touch surface, and a second proposition that the object corresponding to the implicated trajectory is moving.

The error suppression process may operate according to a predictive approach. In one embodiment of the predictive approach, the second movement proposition dictates that the object continues to move along a predicted trajectory during a first evaluation time period. Further, the step of defining said at least two movement propositions may comprise a step of generating the predicted trajectory as a function of the implicated trajectory, and/or the evaluation may comprise a step of matching at least part of the apparent peaks identified in the first evaluation time period to the predicted trajectory. Still further, if the step of updating comprises a step of matching at least part of the apparent peaks to the existing movement trajectories, the error suppression process may further comprise a step of preventing matching of said at least part of the apparent peaks to the implicated trajectory during a second evaluation time period. Thereby, the error suppression process may further comprise a step of defining uncertainty areas around the implicated trajectories in the interaction pattern during the second evaluation time period, and a step of preventing, during the second evaluation time period, the step of updating from operating on the apparent peaks that are located in the uncertainty areas.

Alternative or additionally, the error suppression process may operate according to a reactive approach. In one embodiment of the reactive approach, if the step of updating comprises identifying and adding new movement trajectories to the existing movement trajectories, the evaluation comprises a step of matching candidates of said new movement trajectories to the implicated trajectory. Further, the step of matching may be a function of at least one of: an estimated direction of origin of said candidates and a distance between the implicated trajectory and a current location of said candidates. Still further, the error suppression process may comprise a step of defining uncertainty areas around the implicated trajectories in the interaction pattern during a second evaluation time period, so as to prevent new movement trajectories from being identified in the uncertainty areas.

In one embodiment, the potential tracking problem is caused by at least one of light scattering on the touch surface, and a change in contamination on the touch surface.

In one embodiment, the potential tracking problem is identified by applying at least one of an area heuristic which evaluates an area of the apparent peaks, a velocity heuristic which evaluates a velocity of the existing movement trajectories, an acceleration heuristic which evaluates an acceleration of the existing movement trajectories, a scatter detection heuristic, and a contamination detection heuristic.

The scatter detection heuristic may be applied when the apparent peaks comprise positive and negative apparent peaks, and each positive apparent peak represents a locally increased interaction in the interaction pattern and each negative apparent peak represents a locally decreased interaction in the interaction pattern. In one embodiment, the scatter detection heuristic identifies the potential tracking problem when a positive apparent peak is deemed to be associated with one or more of the negative apparent peaks. In one embodiment, the scatter detection heuristic may further require said one or more of the negative apparent peaks to be located outside the existing movement trajectories. The positive apparent peak may be deemed to be associated with said one or more negative apparent peaks when the positive apparent peak has a given spatial relation to said one or more negative apparent peaks. The given spatial relation may define a maximum distance between the positive apparent peak and said one or more negative peaks.

The contamination detection heuristic may be applied when the apparent peaks comprise positive apparent peaks that represent locally increased interactions in the interaction pattern. In one embodiment, the contamination detection heuristic identifies the potential tracking problem when a positive apparent peak is deemed to be located along one of the existing movement trajectories. In one embodiment, if the method comprises a step of matching at least part of the positive apparent peaks to the existing movement trajectories, so as to identify a set of matched apparent peaks and a set of non-matched apparent peaks, the contamination detection heuristic may further require the positive apparent peak to be included in said set of non-matched apparent peaks.

The first aspect may be implemented to handle double taps on the touch surface. In one such embodiment, the potential tracking problem may be identified when an existing movement trajectory is stationary on the touch surface and has an interaction strength that exceeds a first threshold value while exhibiting a temporal minimum. Further, said at least two movement propositions may comprise a first proposition that the object corresponding to the implicated trajectory is stationary and remains in contact with the touch surface within an evaluation time period, and a second proposition that the object corresponding to the implicated trajectory is intermittently removed from the touch surface and then brought back in contact with the touch surface within the evaluation time period. Still further, the evaluation may comprise a step of monitoring the interaction strength with respect to a second threshold value within the evaluation time period.

In one embodiment, the potential tracking problem may be identified when a plurality of positive peaks are deemed to form a ring-shape in the interaction pattern.

A second aspect of the invention is a computer program product comprising computer code which, when executed on a data-processing system, is adapted to carry out the method of the first aspect.

A third aspect of the invention is a device for tracking movement of one or more objects on a touch surface of a touch-sensitive apparatus. The touch-sensitive apparatus is operable to propagate light by internal reflections inside a light transmissive panel from a plurality of incoupling points to a plurality of outcoupling points so as to illuminate the touch surface from within the light transmissive panel, wherein a light sensing means is optically coupled to the outcoupling points to generate an output signal representing received light at the outcoupling points. The device comprises: an input for the output signal; and a signal processor configured to operate in a time sequence of repetitions. Each repetition comprises the steps of: processing the output signal to generate an interaction pattern that indicates local changes in interaction on the touch surface; processing the interaction pattern for identification of apparent peaks; and updating, based on the apparent peaks, existing movement trajectories of objects deemed to exist on the touch surface in a preceding repetition. The device further comprising an error suppression module configured to operate at least intermittently in said time sequence of repetitions by: processing the apparent peaks and/or the existing movement trajectories to identify implicated trajectories with a potential tracking problem; defining at least two movement propositions for each implicated trajectory; and causing an evaluation of said at least two movement propositions in one or more subsequent repetitions.

A fourth aspect of the invention is a device for tracking movement of one or more objects on a touch surface of the above-mentioned touch-sensitive apparatus. The device is configured to operate in a time sequence of repetitions, and comprises: means for receiving the output signal; means for processing the output signal to generate an interaction pattern that indicates local changes in interaction on the touch surface; means for processing the interaction pattern for identification of apparent peaks; and means for updating, based on the apparent peaks, existing movement trajectories of objects deemed to exist on the touch surface in a preceding repetition. The device further comprises an error suppression means configured to operate at least intermittently in said time sequence of repetitions and comprising: means for processing the apparent peaks and/or the existing movement trajectories to identify implicated trajectories with a potential tracking problem; means for defining at least two movement propositions for each implicated trajectory; and means for causing an evaluation of said at least two movement propositions in one or more subsequent repetitions.

A fifth aspect of the invention is a touch-sensitive apparatus, comprising: a light transmissive panel configured to propagate light by internal reflections from a plurality of incoupling points to a plurality of outcoupling points so as to illuminate the touch surface from within the light transmissive panel; means for providing the light at the incoupling points; means for generating an output signal representing received light at the outcoupling points; and the device for tracking movement of one or more objects according to the third or fourth aspect.

A sixth aspect of the invention is a touch-sensitive apparatus, comprising: a light transmissive panel configured to propagate light by internal reflections from a plurality of incoupling points to a plurality of outcoupling points so as to illuminate the touch surface from within the light transmissive panel; at least one light emitter optically coupled to the incoupling points to provide the light; at least one light detector optically coupled to the outcoupling points to generate an output signal representing received light at the outcoupling points; and the device for tracking movement of one or more objects according to the third or fourth aspect.

Any one of the above-identified embodiments of the first aspect may be adapted and implemented as an embodiment of the second to sixth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 5B is a block diagram of a structure for implementing the method of FIG. 5A.

FIGS. 6A-6B illustrate tracking without error suppression, and a corresponding interpretation of object movement on the touch surface.

FIGS. 7A-7F exemplify a predictive approach for suppressing tracking errors.

DETAILED DESCRIPTION OF EXAMPLE EMBODIMENTS

Figure 1A:
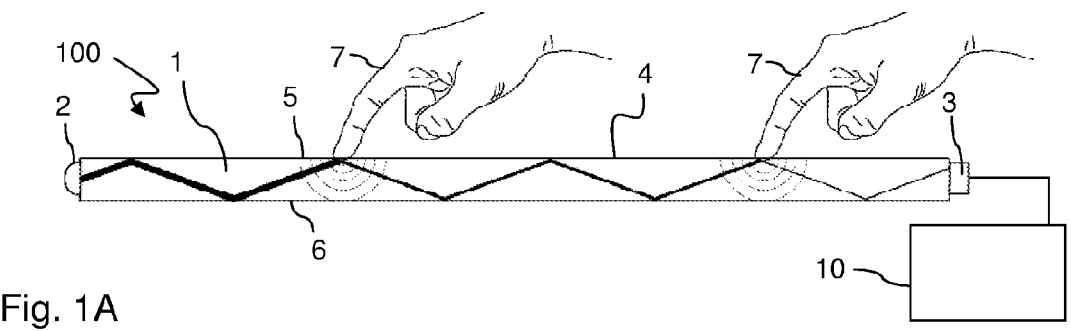
FIGS. 1A-1B are section and top plan views of a touch-sensing FTIR system.

Before describing embodiments of the invention, a few definitions will be given.

A "touch object" or "touching object" is a physical object that actively or intentionally touches, or is brought in sufficient proximity to, a touch surface so as to be detected by one or more sensors in the touch system. The physical object may be animate, e.g. a finger, or inanimate.

An "interaction" occurs when the touch object affects a parameter measured by the sensor.

An "interaction strength" is a relative or absolute measure of the degree of interaction.

An "interaction map" or "interaction pattern" is a two-dimensional (2D) distribution of interaction across the touch surface, or a portion thereof. If the "interaction map" contains attenuation values, it is also denoted an "attenuation map" or "attenuation pattern".

A "touch" denotes a point of interaction as seen in the interaction pattern. A touch may be associated with different touch parameters, such as a location on the touch surface in any coordinate system, an interaction strength, a size (e.g. diameter, area, etc), a shape, etc.

A "frame" or "iteration" denotes a repeated event starting with data collection and ending with determination of touch data. The touch data may comprise or be based on any combination of touch parameters.

As used herein, a "trace" is information about the temporal history of an interaction. Touches from an interaction detected in a sequence of frames, i.e. at different points in time, are collected into a trace.

A trace may be associated with different trace parameters, such as an age, a location, a location history, a size, a shape, etc. The "age" of a trace indicates how long the trace has existed, and may be given as a number of frames, the frame number of the earliest touch in the trace, a time period, etc. The "location" of the trace is given by the location of the most recent touch in the trace, and the "size" of a trace denotes the size of the most recent touch in the trace. The "location history" or "movement trajectory" denotes at least part of the spatial extension of the trace across the touch surface, e.g. given as the locations of the latest few touches in the trace, or the locations of all touches in the trace, a curve approximating the shape of the trace, or a Kalman filter.

Throughout the following description, the same reference numerals are used to identify corresponding elements.

1. Touch-Sensitive Apparatus

Figure 1B:
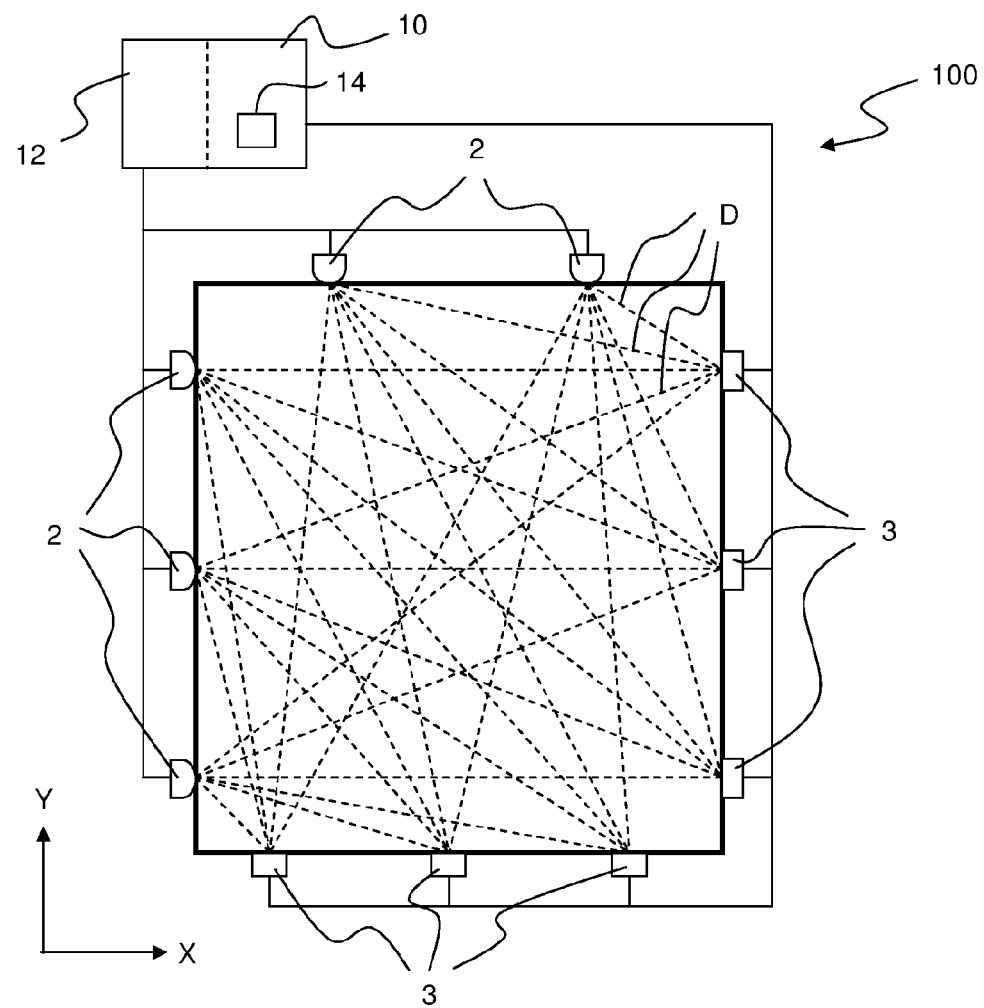

FIGS. 1A-1B illustrate an example embodiment of a touch-sensitive apparatus 100 that is based on the concept of FTIR (Frustrated Total Internal Reflection), also denoted "FTIR system". The apparatus operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is also conceivable that the propagation channel is spaced from the bottom surface 6, e.g. if the panel comprises multiple layers of different materials. The apparatus 100 may be designed to be overlaid on or integrated into a display device or monitor.

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in the energy (power/intensity) of the transmitted light, as indicated by the thinned lines downstream of the touching objects 7 in FIG. 1A.

The emitters 2 are distributed along the perimeter of the touch surface 4 to generate a corresponding number of light sheets inside the panel 1. In the example of FIG. 1B, each emitter 2 generates a beam of light that expands in the plane of the panel 1 while propagating in the panel 1. Each beam propagates from one or more entry or incoupling points (ports) on the panel 1. The sensors 3 are distributed along the perimeter of the touch surface 4 to receive the light from the emitters 2 at a number of spaced-apart outcoupling points (ports) on the panel 1. It should be understood that the incoupling and outcoupling points merely refer to the position where the beam enters and leaves, respectively, the panel 1. Thus, one emitter/sensor may be optically coupled to a number of incoupling/outcoupling points. In the example of FIG. 1B, however, the detection lines D are defined by individual emitter-sensor pairs.

The sensors 3 collectively provide an output signal, which is received and sampled by a signal processor 10. The output signal contains a number of sub-signals, also denoted "projection signals", each representing the energy of light emitted by a certain light emitter 2 and received by a certain light sensor 3. Depending on implementation, the signal processor 10 may need to process the output signal for separation of the individual projection signals. Conceptually, the touch apparatus 100 is considered to define a grid of detection lines D on the touch surface 4, where each detection line D corresponds to a light propagation path from an emitter 2 to a sensor 3, as projected onto the touch surface 4. Thus, the projection signals represent the received energy or power of light on the individual detection lines D. It is realized that the touching object 7 results in a decrease (attenuation) of the received energy on one or more detection lines D.

As will be explained below, the signal processor 10 may be configured to process the projection signals so as to determine a distribution of attenuation values (for simplicity, referred to as an "attenuation pattern") across the touch surface 1, where each attenuation value represents a local attenuation of light. The attenuation pattern may be represented in many different ways, e.g. as attenuation values arranged in a regular x-y-grid, such as in an ordinary digital image, although other types of grids are conceivable, e.g. hexagonal patterns or triangular meshes. The attenuation pattern may be further processed by the signal processor 10 or by a separate device (not shown) for touch determination, which may involve extraction of touch data, such as a position (e.g. x,y coordinates), a shape or an area of each touching object.

In the illustrated example, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates one example of an FTIR system. For example, the detection lines may instead be generated by sweeping or scanning one or more beams of light inside the panel 1, and the light may instead be coupled into and out of the panel 1 via the top and bottom surfaces 5, 6, e.g. by the use of dedicated coupling elements attached to the panel 1. Examples of alternative FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concept may be applied to such alternative FTIR systems as well.

2. Attenuation Pattern

A reconstruction function or algorithm may be used for determining the attenuation pattern on the touch surface 4, based on the projection signals in the output signal. Embodiments of the invention may use any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction function may generate the attenuation pattern by adapting one or more basis functions and/or by statistical methods such as Bayesian inversion. Examples of such reconstruction functions designed for use in touch determination are found in WO 2010/006883, WO2009/077962, WO2011/049511, WO2011/139213 and WO2012/050510, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

The reconstruction function is designed based on the assumption that the input values $s_t$ at time point t depend on the attenuation pattern, $a_t$, according to a projection function $\mathcal{P}$, which reflects the properties of the physical touch system: $s_t = \mathcal{P}(a_t)$. The reconstruction algorithm is thus designed to reconstruct $a_t$ from $s_t$ by use of a reconstruction function: $a_t = \mathcal{P}^{-1}(s_t)$.

It is to be understood that the format of the input values $s_t$ may be specific to the reconstruction function $\mathcal{P}^{-1}$. To enable reconstruction of an attenuation pattern, the input values $s_t$ may be represented as attenuation values for individual detection lines. Such attenuation values may e.g. be based on transmission values obtained by dividing the projection value $I_k$ of the k:th detection line by a respective reference value: $T_k = I_k/REF_k$. By proper choice of reference values, the transmission values may be generated to represent the fraction (e.g. in the range [0, 1]) of the available light energy that has been measured on each of the detection lines. The input value of each detection line may e.g. be given by: $s_k = -\log(T_k)$ or an approximation thereof, e.g. $s_k = 1 - T_k$.

The reconstructed attenuation pattern $a_t$ will represent the distribution of accumulated attenuation on the touch surface at time point t. The accumulated attenuation includes both attenuation caused by touching objects and attenuation caused by contaminations on the touch surface, and such an interaction pattern $a_t$ may thus be denoted a "total attenuation pattern" or "total pattern".

As indicated in the Background section, it is known in the art to at least partly compensate the total attenuation pattern $a_t$ for the influence of the contaminations on the touch surface, resulting in a compensated attenuation pattern $o_t$, denoted "touch attenuation pattern" or "offset pattern". For example, WO2011/049512 proposes a touch apparatus which repeatedly generates a current light status (corresponding to the total pattern). The touch apparatus also repeatedly updates a background status (or "background pattern"), which is a two-dimensional distribution of estimated attenuation values caused by contaminations on the touch surface. A compensated light status (corresponding to the offset pattern) is then formed by subtracting the background status from the current light status. An alternative or supplementary compensation technique is proposed in WO2011/028169, in which the reference values ($REF_k$) used in converting the projection values into input values, are intermittently updated so as to include the influence of contaminations on the touch surface 4. By tracking the influence of contaminations via the updating of the reference values, the touch apparatus compensates for the contaminations already in the input to the reconstruction function, which thereby directly generates the offset pattern. WO2011/049512 and WO2011/028169, as well as Applicant's PCT application PCT/SE2012/051006, filed on Sep. 24, 2012, are all incorporated by reference in their entirety.

Figure 2A:
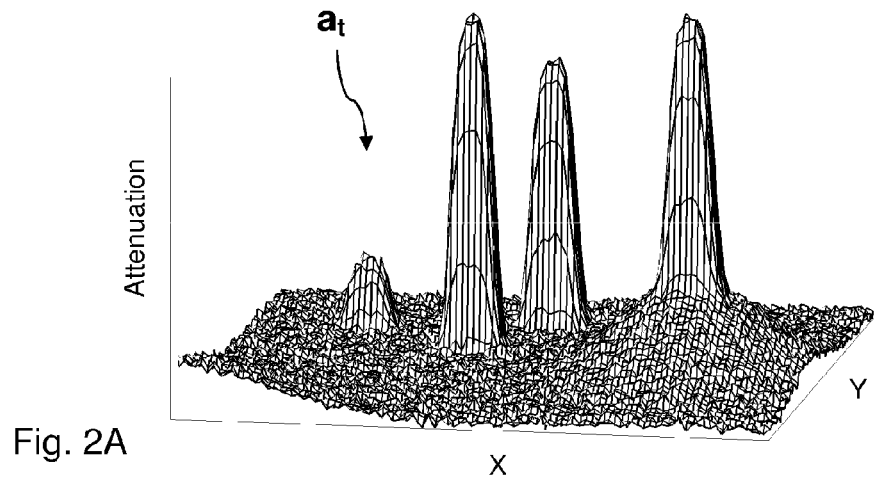
FIGS. 2A-2C are 3D plots of a total attenuation pattern, a background pattern, and an offset pattern, respectively.
Figure 2B:
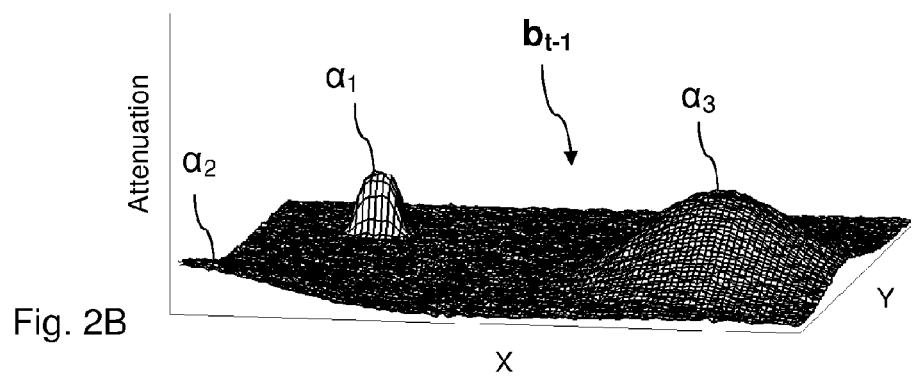
Figure 2C:
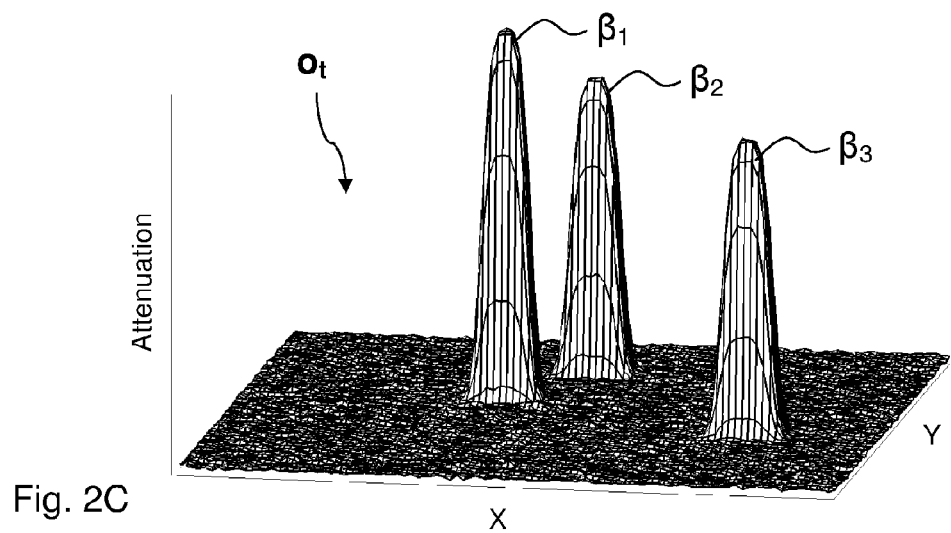

A total pattern $a_t$ is illustrated in FIG. 2A as a 3D plot in the coordinate system X,Y of the touch surface (cf. FIG. 1B). The pattern $a_t$ represents the accumulated attenuation on the touch surface, both from touches and contamination. FIG. 2B is a plot of a background pattern $b_{t-1}$ which exhibits a first attenuation component α1 caused by a fingerprint from an earlier touch, a second attenuation component α2 caused by smear from a palm resting on the touch surface, and a third attenuation component α3 caused by a liquid spill. FIG. 2C is a plot of the offset pattern $o_t$ obtained by subtracting $b_{t-1}$ from $a_t$, pixel by pixel. Three peaks β1, β2, β3 forming three touches are seen against a uniform background level close to zero attenuation.

It is realized that this offset pattern $o_t$ is derived to reflect long-term changes in touch-related attenuation on the touch surface, e.g. differences in attenuation caused by a current arrangement of objects on the touch surface compared to a clean touch surface without touching objects, and more or less excluding differences caused by contamination.

It is also possible to generate a differential attenuation pattern that represents changes on a shorter time scale, typically changes that occur over a time period Δt which is (much) shorter than the temporal extent of traces. Such a differential attenuation patterns is denoted "difference pattern" herein and designated by $da_t$.

The difference pattern $da_t$ may be calculated by subtracting a current offset pattern with a previous one: $da_t = o_t - o_{t-\Delta t}$. Alternatively, the difference pattern $da_t$ may be calculated by subtracting a current total pattern with a previous one: $da_t = a_t - a_{t-\Delta t}$, provided that Δt is selected to be small enough to avoid significant build up of contamination, while being long enough for the movement of touching objects to result in attenuation changes. In one example, the time difference is larger than about 5 ms, preferably about 20-80 ms but may be as large as 1-5 seconds.

In another alternative, the difference pattern $da_t$ may be reconstructed from change values $ds_t$ that are obtained by taking the difference in input values between the current time point (t) and the previous time point (t−Δt):

$$ds_t = s_t - s_{t-\Delta t} = \log\left(\frac{I_{t-\Delta t}}{REF}\right) - \log\left(\frac{I_t}{REF}\right) = -\log\left(\frac{I_t}{REF} / \frac{I_{t-\Delta t}}{REF}\right) = -\log(I_t / I_{t-\Delta t}),$$

or, equivalently, by the difference in logarithmic signal values:

$$ds_t = -\log(I_t/I_{t-\Delta t}) = \log(I_{t-\Delta t}) - \log(I_t).$$

Thus, the reconstruction function $\mathcal{P}'$ may operate on change values $ds_t$ to generate the difference pattern $da_t$, assuming that the reconstruction function $\mathcal{P}'$ is at least approximately linear:

$$da_t = a_t - a_{t-\Delta t} = \mathcal{P}'(s_t) - \mathcal{P}'(s_{t-\Delta t}) = \mathcal{P}'(s_t - s_{t-\Delta t}) = \mathcal{P}'(ds_t).$$

By operating on change values, the need to calculate, store and retrieve the total pattern or offset pattern at different time points may be obviated.

Further alternatives for generating the difference pattern are disclosed in Applicant's PCT application PCT/SE2012/051073, filed on Oct. 8, 2012, which is incorporated by reference in its entirety.

Figure 3A:
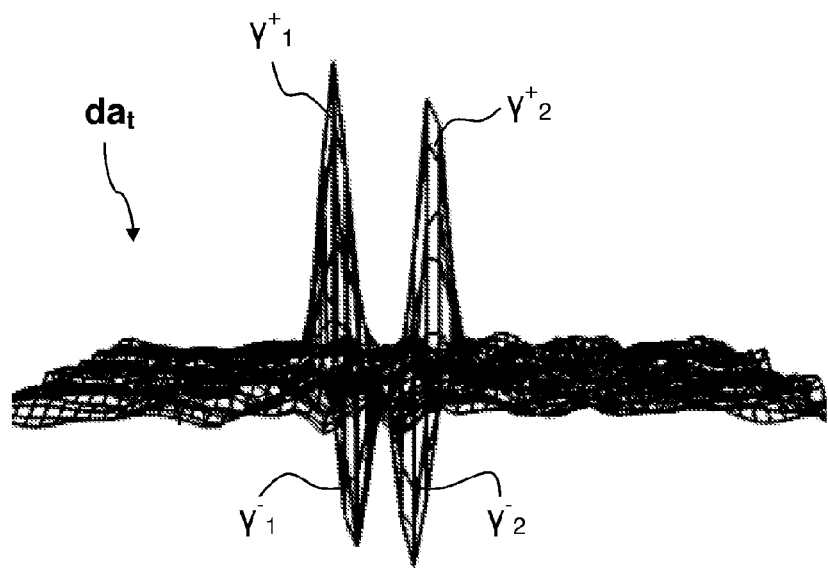
FIGS. 3A-3B are plots of a difference pattern representing two moving objects.
Figure 3B:
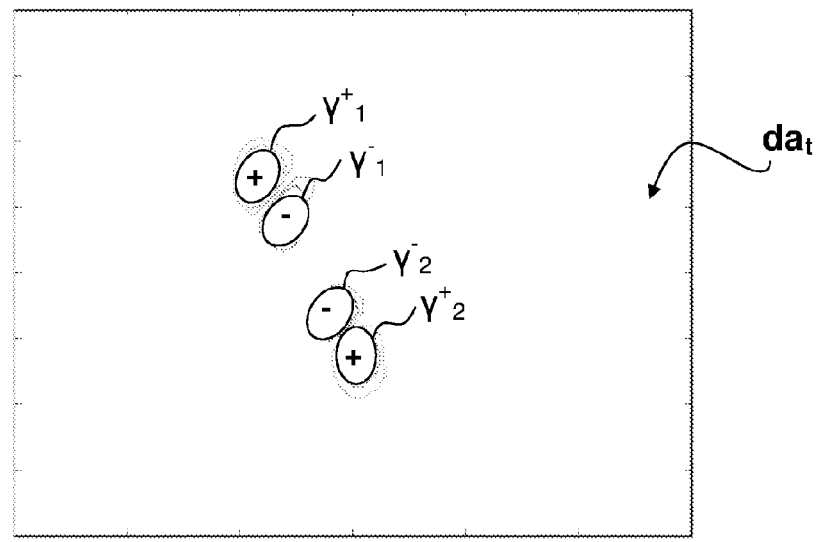

Irrespective of implementation, the difference pattern $da_t$ is a distribution of difference values across the touch surface (or a relevant part of the touch surface), where each difference value may represent a local change (increase/decrease) in attenuation during Δt in a specific position or reconstruction cell (pixel) on the touch surface. The difference pattern $da_t$ may thus be seen as an image of the change in touch interaction and in contamination contribution during Δt across the touch surface. The difference pattern $da_t$ mainly indicates the temporal change in attenuation caused by moving objects in contact with the touch surface, as well as objects that are removed from or added to the touch surface during Δt. A moving object generally appears as a "dipole peak" in the difference pattern, i.e. a combination of a positive peak and a negative peak. FIG. 3A is a 3D plot of a difference pattern $da_t$ containing two dipole peaks $\gamma_1^+, \gamma_1^-$ and $\gamma_2^+, \gamma_2^-$. FIG. 3B is a plan view of the difference pattern $da_t$ in FIG. 3A. When an object is moved during Δt, the corresponding touch occupies new pixels, resulting in a positive peak, and leaves old pixels, resulting in a negative peak. If an object is removed from the touch surface, the removed touch will be represented by a single negative peak in the difference pattern, and if an object is brought into contact with the touch surface, the new touch will be represented by a single positive peak. In FIG. 3B, it is realized that the objects have moved away from each other during Δt.

Embodiments of the invention may operate on either the total pattern, the offset pattern or the difference pattern, or combinations of these patterns, to track movement of objects on the touch surface. In the following, reference is therefore made to "attenuation pattern" or "pattern", which is intended to designate all of the above-mentioned types of patterns, unless otherwise stated.

3. Tracking

Figure 4:
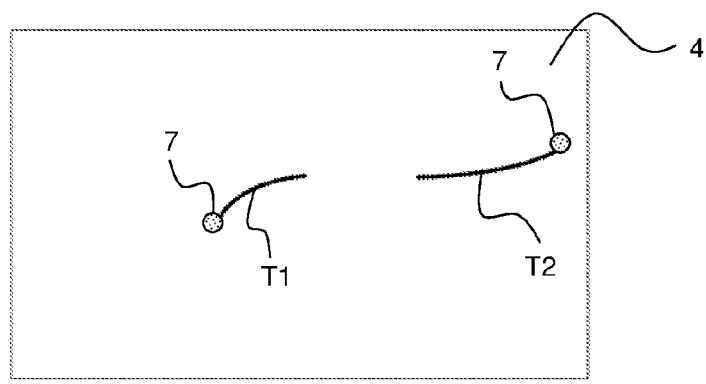
FIG. 4 illustrate movement trajectories of two objects on a touch surface.

The touch apparatus 100 is operated to generate the pattern at consecutive time points, so as to enable the movement of objects on the touch surface to be tracked as a function of time. The tracking results in movement trajectories on the touch surface and may e.g. allow for recognition of user-controlled gestures on the touch surface. As an example, FIG. 4 illustrates movement trajectories T1, T2 of two objects 7 that are dragged on the touch surface 4 in an "un-pinch" gesture, which may be interpreted as a "zoom in" command.

Figure 5A:
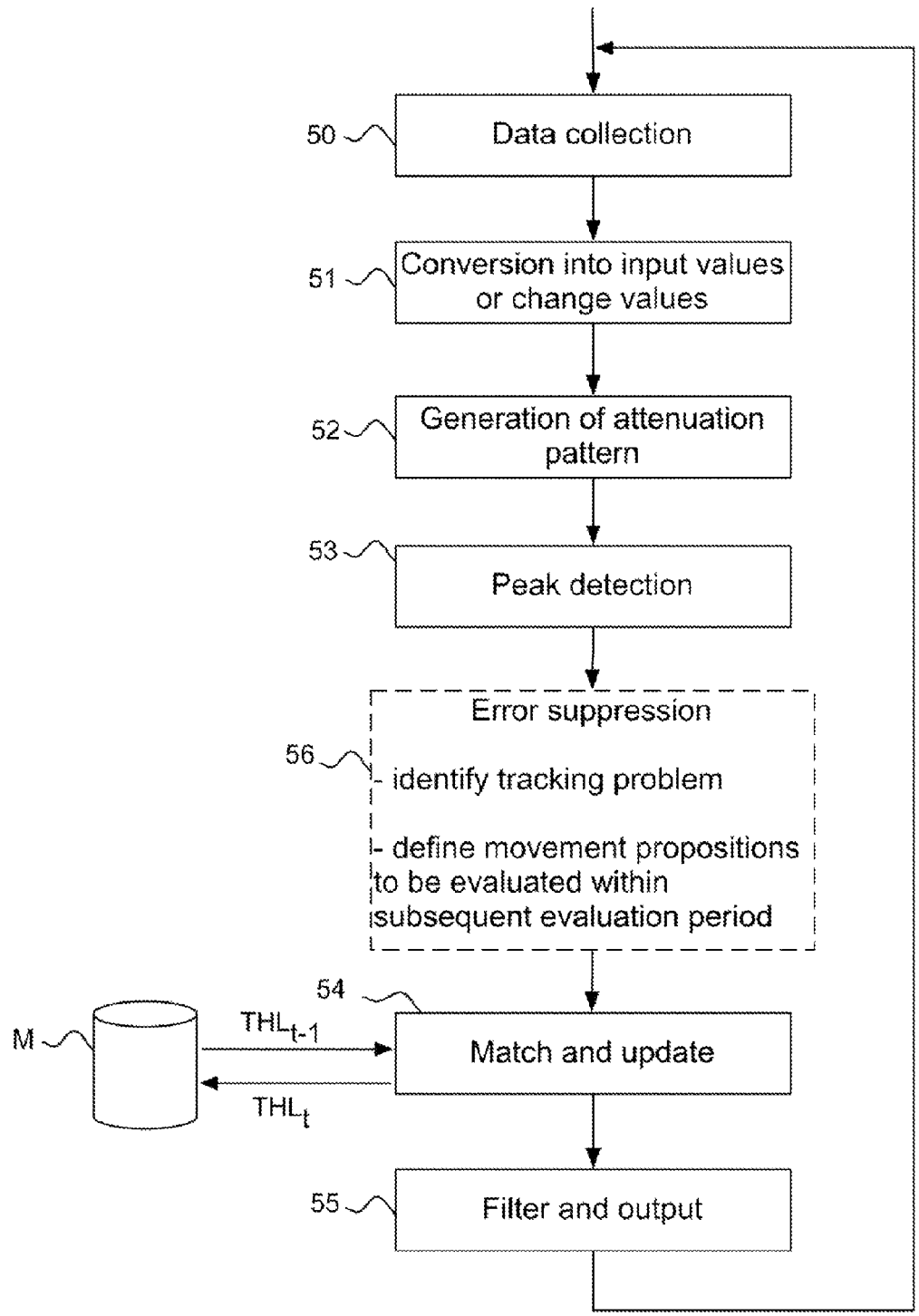
FIG. 5A is a flow chart of a method for tracking objects according to an embodiment of the invention.

FIG. 5A is a flow chart of an embodiment of a method for tracking objects in the apparatus 100 of FIG. 1. The method involves a sequence of steps 50-56 that are executed repeatedly, typically by the signal processor 10 (FIG. 1). In the context of this description, each sequence of steps 50-56 is denoted a "frame" or an "iteration".

Each frame starts by a data collection step 50, in which the output signal is acquired from the light sensors 3, e.g. by sampling a value from each of the aforesaid projection signals $I_t$. The data collection step 50 results in one projection value for each detection line. It may be noted that the data may, but need not, be collected for all available detection lines in the apparatus 100. The data collection step 50 may also include pre-processing of the projection values, e.g. filtering for noise reduction.

In a conversion step 51, the projection values $I_t$ are processed for conversion into input values $s_t$ or change values $ds_t$, depending on implementation.

A subsequent pattern generation step 52 operates a reconstruction function P' on the input or change values to generate the pattern, e.g. according to any of the techniques described in Chapter 2.

In a peak detection step 53, the pattern is then processed for detection of peaks, e.g. using any known technique. In one embodiment, a global or local threshold is first applied to the pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. Local minima may be identified in similar way. There are also numerous other techniques as is well known in the art, such as clustering algorithms, edge detection algorithms, standard blob detection, water shedding techniques, flood fill techniques, etc. Step 53 results in a peak list which may include values of different peak parameters, e.g. peak position, peak size, peak shape, peak attenuation, and peak sign. The peak attenuation may be given by a peak attenuation value or a weighted sum of attenuation values within the peak shape. The peak sign indicates if the peak is positive or negative in the pattern.

Step 54 matches the detected peaks in the peak list to existing traces in a trace history list $THL_{t-1}$, which is a record of the existing traces and is retrieved from electronic memory M. The record may be implemented by any suitable data structure, linear or non-linear, such as list, a hash table, a binary tree, etc. The trace history list is maintained to contain values of trace parameters for the traces deemed relevant to the current frame, e.g. all traces deemed to exist, which also may include any traces deemed not unlikely to exist. As indicated above, the trace parameters may e.g. include age, location, location history, attenuation strength, size, and shape for each trace. The matching results in matched peaks, non-matched peaks and non-matched traces. The trace history list $THL_{t-1}$ is then updated based on the matching and stored as a current trace history list $THL_t$ in memory M for use in a forthcoming frame. The updating may involve an update of trace parameter values for existing traces, a removal of terminated traces and an insertion of trace parameter values for new traces.

In step 55, current touch data is determined and output, whereupon the process returns to the data collection step 50.

The current touch data may indicate terminated traces (touch up), new traces (touch down) and associated parameter values, and ongoing traces and associated parameter values. The parameter values may be determined by selecting values determined during the steps of peak detection, matching and updating, such as peak parameter values or trace parameter values. Step 55 may output touch data for all existing and new traces identified in step 54. However, it is conceivable that step 55 implements an "output filter", which manipulates the current touch data to improve the user experience. For example, the output filter may postpone output of new traces for a number of frames to suppress the influence of erroneous peak detections. Likewise, the output filter may be configured to delay removal of a non-matched trace for a number of frames, e.g. by outputting the latest touch data for the non-matched trace during these frames or by outputting touch data that is projected for these frames based on the trace parameter values in the touch history list. It is also conceivable that the output filter is configured to make an active selection among the traces found in step 55 and only output current touch data for the selected traces.

It is realized that the tracking is a demanding task, especially in the presence of interferences, since it must not only correctly match touches detected at different times, but also correctly detect the occurrence of new touches (i.e. a start of a new movement trajectory, "touch down") and the disappearance of existing touches (i.e. a termination of an ongoing movement trajectory, "touch up"). It is also to be noted that touches differ significantly in attenuation both within the pattern and as a function of time. For example, moving objects ("drags") are often seen to yield weaker attenuation than stationary objects in an FTIR-based touch apparatus. Interferences may, e.g., be caused by measurement noise, artifacts introduced by the reconstruction function, or ambient light, i.e. light that originates from sources outside of the panel and is detected by the sensors. As will be explained in Section 4 below, interferences may also originate from incomplete compensation for contaminations on the touch surface and/or be caused by the light that is scattered by the touching object. It is realized that the tracking process may be seriously impeded if interferences are mistaken for true touches and used as starting points for new traces or added as locations to existing traces. By proper design of the above-mentioned output filter, user exposure to minor tracking errors may be avoided. However, larger tracking errors may propagate in the trace history list and disrupt the user experience. An example is given in FIGS. 6A-6B. FIG. 6A illustrates touch locations (black dots) which are identified and matched in a time-sequence of frames as a finger is dragged across a touch surface. The dashed line indicates that the tracking fails for a number of frames, causing the tracking to separate the drag into a first trace T1 which is brought to a halt, and a second trace T2 which moves away from the first trace T1. The failed tracking may, e.g., be caused by the finger depositing a fingerprint which is matched into the first trace T1, whereby the first trace T1 is perceived as being halted. As the finger moves away from the fingerprint, the tracking again detects peaks caused by the finger and identifies these as belonging to new trace T2. As shown in FIG. 6B, an application controller that receives that touch data from the output step 55 may interpret the first and second traces as representing an un-pinch gesture (cf. FIG. 4) of two objects 7 and initiate a zoom in action, to the surprise and despair of the user.

To suppress tracking errors, the method in FIG. 5A includes an error suppression step 56, which is designed to reduce the likelihood that tracking errors are introduced and propagated as the trace history list is updated in step 54. In the illustrated embodiment, the error suppression step 56 identifies a potential tracking problem for a particular trace, denoted an "implicated trace", and then defines movement propositions for the implicated trace. The movement propositions are different hypothesises that are evaluated downstream in the tracking process, e.g. within a given evaluation period. In the following, it is assumed that the evaluation is performed as part of step 56. The outcome of the evaluation is then used for controlling the updating of the implicated trace, in step 54 of a subsequent frame. It is to be understood that step 56 may, but need not, be executed during every frame. Likewise, the subsequent evaluation of the movement propositions may, but need not, be executed for every frame during the evaluation period.

In one embodiment, the potential tracking problem is identified by applying a dedicated heuristic to the peaks detected in step 53, so as to identify any uncertain peaks ("possibly false peaks"), i.e. peaks that are deemed likely (or deemed not unlikely) to originate from interferences in a broad sense. The heuristic may be tailored to identify peaks from a specific type of interference. Examples of different heuristics are given in Section 4 below.

With reference to the embodiment in FIG. 5A, and variants thereof, it is to be understood that one or more of the indicated steps may be effected concurrently. For example, the data collection step 50 of a subsequent frame may be initiated concurrently with any one of the steps 51-56.

3.1 Predictive Approach

In one embodiment, the error suppression step 56 is based on a predictive approach, i.e. the movement propositions represent possible future trajectories of the implicated trace. To address the tracking problem illustrated in FIG. 6, step 56 may define two different movement propositions: the object is stopped ("stop proposition") and the object continues to move in its current direction along a tentative trace ("move proposition").

The predictive approach is exemplified in FIG. 7, in which black dots represent matched touch locations, a square represents an identified tracking problem, crosses represent detected peaks, white dots represent predicted touch locations, full lines represent a trace, and dashed lines represent a tentative trace. FIG. 7A gives an overview of the tentative trace as laid out over the evaluation period $\Delta t_1$. The predicted locations p1-p6 are generated to represent plausible locations of the implicated trace in each of the successive frames f1-f6 when the movement propositions are evaluated. The predictive locations p1-p6 may be defined by step 56, e.g. by extrapolating from the location history of the implicated trace, as is well-known to the skilled person. A search area s1-s6 is defined in relation to each predicted location p1-p6 and may, but need not, include the respective predicted location p1-p6. In the evaluation of the movement propositions, detected peaks that fall within the search areas s1-s6 will be processed for evaluating the move proposition. If the move proposition is deemed likely during, or at the end of, the evaluation period $\Delta t_1$, step 54 will be signaled to update the implicated trace in the trace history list accordingly. Otherwise, step 54 will be signaled to update the implicated trace as being stopped. The length of the evaluation period $\Delta t_1$ affects the sensitivity of the FTIR system to tracking problems. It should be long enough to enable detection of continued movement, while being short enough to avoid that movement of other objects are erroneously connected to an implicated trace. The length of the evaluation period $\Delta t_1$ as well as the size and placement of the search areas s1-s6 is a matter of routine experimentation.

Figure 7C:
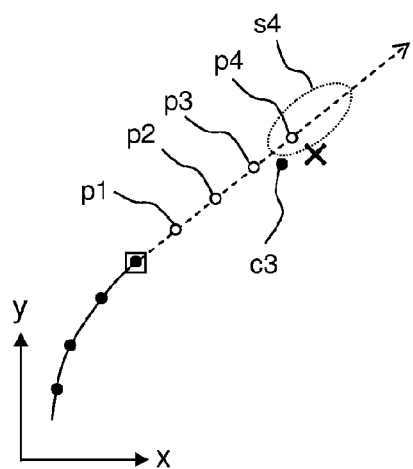
Figure 7D:
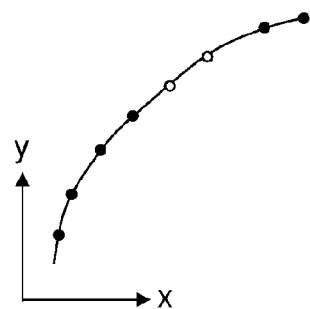

One of many conceivable implementations is illustrated in FIGS. 7B-7D. In FIG. 7B, a peak is found during frame f3 in search area s3 and is designated as a candidate location c3. If more than one peak is found in the search area, the evaluation may select the best match (e.g. based on mutual distance and/or similarity in size, attenuation strength, etc) as the candidate location, or operate on plural candidate locations. In FIG. 7C, a peak identified in frame f4 is found to be matched to the candidate location c3 (e.g. based on mutual distance and/or similarity in size, attenuation strength, etc). This may cause step 56 to choose the move proposition and cause the implicated trace to be updated by step 54 as indicated in FIG. 7D. Clearly, step 56 may require a larger sequence of matched candidate locations before accepting the move proposition. In a variant (not shown), step 56 may require the successive candidate locations to be located within the respective search areas before accepting the move proposition. In another variant (not shown), step 56 may accept the move proposition as soon as one candidate locations is within one of the search areas. With respect to FIG. 7D, it should be understood that predicted locations (p1, p2 and possibly p3) may, but need not, be added to the implicated trace when it is updated in step 54.

Figure 7E:
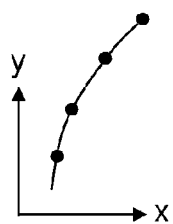

If step 56 instead chooses the stop proposition, the implicated trace will be updated as indicated in FIG. 7E. It should be realized that the front end of the updated trace comprises a plurality of touch locations on top of each other (one for each frame f1-f6).

In a variant (not shown), the search areas s1-s6 are replaced or supplemented by a single search area which is defined in relation to the implicated trace. The single search area may be defined to include the extent of the tentative trace during the evaluation period $\Delta t_1$ (cf. FIG. 7A). For example, all peaks detected in the single search area may be used for evaluating the move proposition.

Figure 7F:
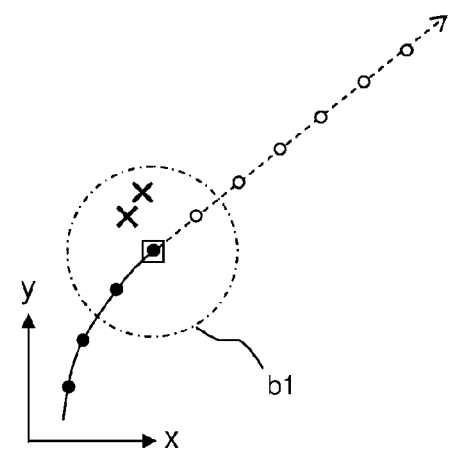

FIG. 7F illustrates an extension of the predictive approach. Here, step 56 defines a blocking area or uncertainty area b1 that includes the tracking problem. The blocking area b1 may be set with respect to the location of the tracking problem, the current location of the implicated trace, a predicted location of the implicated trace in a forthcoming frame, etc. The blocking area b1 will address the fact that the cause of the tracking problem may persist and affect the tracking process in forthcoming frames. The blocking area may be associated with different functions. In one variant, step 53 is prevented from detecting peaks within the blocking area b1. In another variant, the evaluation in step 56 is prevented from evaluating the movement propositions based on peaks detected in the blocking area b1. In yet another variant, step 54 is prevented from matching peaks detected in the blocking area b1 to other traces (i.e. not only the implicated trace). Combinations of these variants are possible. For example, in FIG. 7F, the peaks in the blocking area b1 may neither result in a new trace, nor be used for assessing the movement propositions. The blocking area b1 typically exists during an evaluation period $\Delta t_2$ which may, but need not, be identical to the period $\Delta t_1$. It may be desirable to set $\Delta t_2$ independently of $\Delta t_1$, since $\Delta t_2$ is related to the time scale of the origin of the tracking problem whereas $\Delta t_1$ is related to the time scale of true interaction with the touch surface.

In a variant (not shown), the blocking area is omitted and new peaks are allowed to be detected by step 53 and used by step 54, but not for matching to the implicated trace. Thus, step 54 may be allowed to only use the detected peaks to create new traces and/or update other traces than the implicated trace.

3.2 Reactive Approach

In another embodiment, the error suppression step 56 is based on a reactive approach, viz. that the movement propositions are evaluated based on traces that are identified in the vicinity of the implicated trace, whereby such a trace may be connected to the implicated trace. The reactive approach may also use the stop proposition and the move proposition.

Figure 8A:
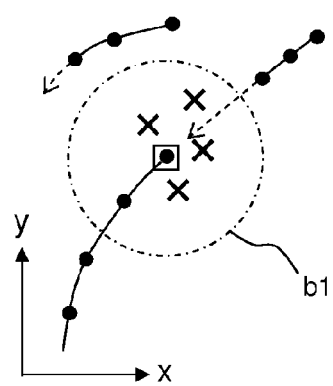
FIGS. 8A-8B exemplify a reactive approach for suppressing tracking errors.
Figure 8B:
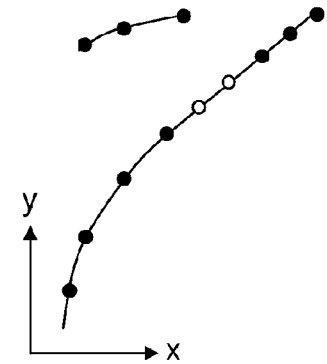

The reactive approach is exemplified in FIG. 8, in which black dots represent matched touch locations, a square represents an identified tracking problem, dots represent detected peaks, and dashed arrows represent estimated trajectories of origin. FIG. 8A shows the tracking a number of frames after detection of a potential tracking problem. A blocking area or uncertainty area b1 is defined to include the potential tracking problem, e.g. as described above with reference to FIG. 7F. The blocking area b1 will exist during an evaluation period $\Delta t_2$ and is used to prevent peaks occurring in the blocking area b1 from being used for evaluating the movement propositions. Depending on implementation, step 53 may be blocked from detecting peaks in blocking area b1 or step 56 may be prevented from evaluating the movement propositions based on peaks detected in the blocking area b1. In analogy with the example in FIG. 7F, the blocking area b1 may have the additional effect of preventing step 54 from matching peaks detected in the blocking area b1 to other traces. Step 56 evaluates the movement propositions by analyzing new traces that are detected outside the blocking area b1 during the evaluation period $\Delta t_1$ for possible connection to the implicated trace. This evaluation may involve a determination of the apparent direction of origin of each new trace, e.g. by projecting the new trace backwards, as indicated by dashed arrows in FIG. 8A. If the direction of origin is sufficiently near the implicated trace, step 56 may choose the move proposition and cause the implicated trace to be updated by step 54 as indicated in FIG. 8B. Alternatively or additionally, the evaluation in step 56 may be based on the distance between the implicated trace and the origin of each new trace, and/or similarities in area and/or shape between the touches in the implicated trace and the touches in the new trace.

In a variant (not shown), which may be combined with the use of blocking areas, step 56 is limited to evaluating new traces that have an origin within a dedicated search area, which may be defined with respect to the implicated trace, or the tracking problem. The use of such a search area may reduce processing by limiting the amount of new traces to evaluate. The search area may have a fixed location and extent, or it may have a time-varying extent and/or location within the evaluation period $\Delta t_1$.

3.3 Other Movement Propositions

The stop and move propositions are only examples of propositions that may be used in step 56. Even if these propositions capture many movements of objects on a touch surface, they may be combined with or replaced for other and more detailed movement propositions, e.g. a reversal proposition (that the object reverses direction), a left turn proposition (that the object turns 90° to the left), a right turn proposition (that the object turns 90° to the left), etc.

Figure 9:
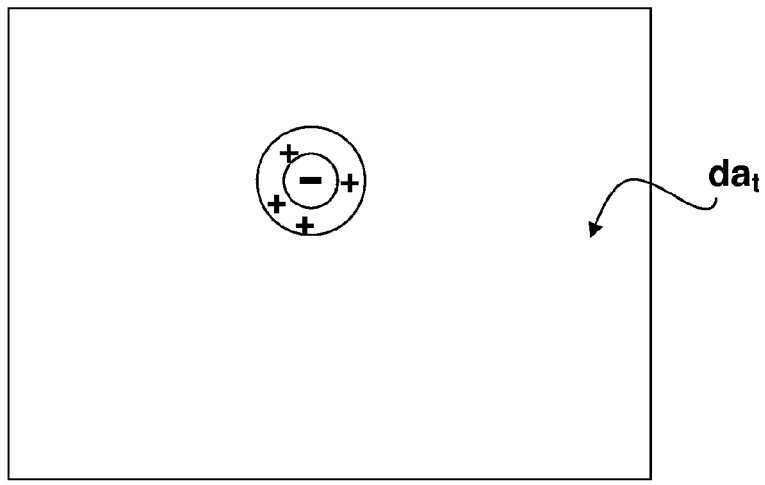
FIG. 9 is a plot of a difference pattern with a torus shape.

In certain FTIR systems, it may be difficult for the tracking process to distinguish between a touch up event (a touching object that is lifted from the touch surface) and a touching object (stationary trace) that starts to move. For example, in a difference pattern, the touch up event may not only result in a negative peak, but also in a "torus" of small positive peaks in a circle around the negative peak. FIG. 9 is an example of a difference pattern $da_t$ with such a torus shape. Reverting to FIG. 3B, it is realized that the resulting combination of a negative and positive peaks may be erroneously interpreted as a movement of an object instead of a touch up event. To handle this potential tracking error, step 56 may be configured to identify the torus shape as a potential tracking problem, and define a move proposition and a "touch up proposition", which are to be evaluated during the evaluation period $\Delta t_1$. The move proposition may be evaluated according to any of the predictive or reactive approaches. The touch up proposition may be chosen if the move proposition is rejected. Alternatively, the touch up proposition may be affirmed by evaluation of the presence/absence of peaks at the location of the potential tracking problem.

Generally, it should be noted that if step 56 is able to identify or classify different types of potential tracking problems, such as torus shapes, small spurious peaks, a quadropole (see below), step 56 may define different combinations of propositions to be evaluated depending on the type of potential tracking problem. For example, a quadropole may result in move and stop propositions, whereas a torus shape may result in move and touch up propositions. Alternatively or additionally, different propositions may be defined by step 56 depending on the location history of the implicated trace (i.e. the movement characteristic of the implicated trace during preceding frames), e.g. such that stop and move propositions are defined for an implicated trace in motion, and that touch up and move propositions are defined for an implicated trace in rest.

3.4 Tracking of Intermittently Lifted Objects

Figure 10A:
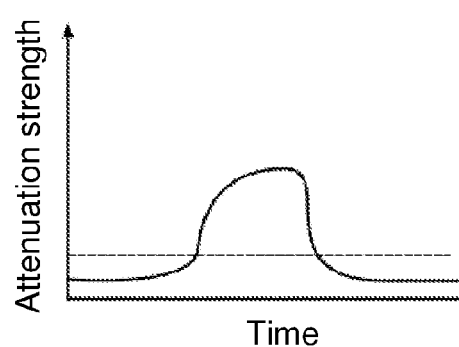
FIGS. 10A-10D are graphs of attenuation as a function of time for different types of user interaction.
Figure 10B:
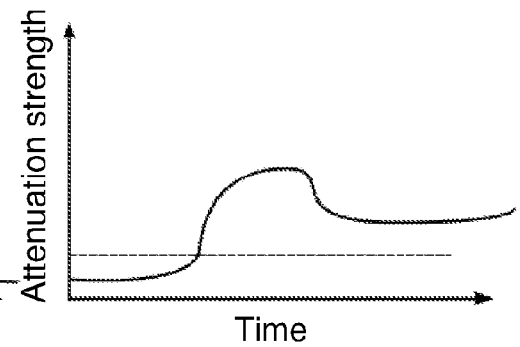
Figure 10C:
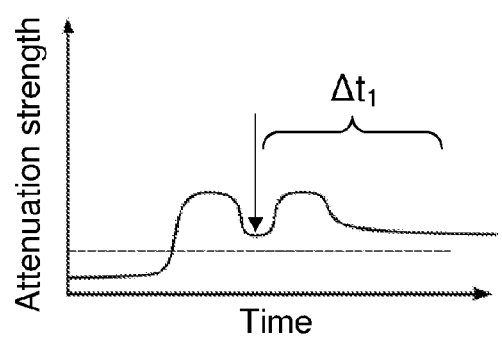
Figure 10D:
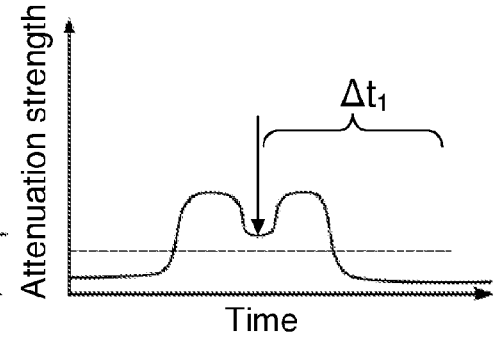

The inventive tracking technique is also applicable for tracking of objects that are intermittently lifted from the touch surface, e.g. to produce a double tap. A double tap involves two taps in succession, i.e. a touch down, a touch up, a touch down, and a touch up. If the time between the taps is small, the double tap may be mistaken for a stationary trace, i.e. that the object touches the touch surface and then is held in this position. FIG. 10 include graphs of temporal variations in attenuation strength at one location in an offset pattern for different types of touch events. FIG. 10A represents a single tap on the touch surface. A touch down event is detected when the attenuation strength rises above a threshold level TH, and a touch up event is detected when the attenuation strength falls below the threshold level TH (or a different threshold level). FIGS. 10B-10C are examples of time variations in attenuation strength when an object touches the touch surface and then is held still. The decrease in attenuation strength some time after the touch down event may be (partly) attributed to variations in the application pressure between the touching object and touch surface. FIG. 10D represents two taps in rapid succession, where the time between the taps does not allow the attenuation strength to fall below the threshold level TH. A conventional tracking process would therefore ignore the double tap in FIG. 10D. The error suppression step 56 may be adapted to handle this situation. For example, step 56 may identify a potential tracking problem when it finds that a trace has a temporal minimum in attenuation strength within a certain time period from its initiation (i.e. from the touch down event). The temporal minimum is found at the arrow in FIGS. 10C-10D. Step 56 may also define a "contact proposition" (that the object remains in contact with the touch surface) and a "double tap proposition" (that the object generates a double tap). These propositions are then evaluated by step 56 during an evaluation period $\Delta t_1$. If the attenuation strength falls below the threshold level TH within $\Delta t_1$, the double tap proposition may be selected, otherwise the contact proposition may be selected.

4. Origin and Detection of False Peaks

As explained above, false peaks may be used as an indicator of a potential tracking problem. Some false peaks are generated by interferences specific to FTIR systems. Below, two different origins of false peaks are discussed in some detail, followed by a description of different heuristics that may be used to identify false peaks.

4.1 False Peaks Caused by Light Scattering

Light scattering is a physical process that causes some of the propagating light in the panel to deviate from its original path. In an FTIR system, there may be inherent scattering in the panel, e.g. scattering caused by irregularities in the boundary surfaces that define the radiation propagation channel, and scattering caused by irregularities in the bulk material of the panel. This scattering may be invariant over time and may be taken into account by calibration of the apparatus.

In an FTIR system, light scattering may also be caused by the touching objects, as well as contaminations on the touch surface, such as fingerprints and smear. This type of light scattering is dynamic, i.e. it changes as the system is used since both the location of the objects and the distribution of contamination may vary over time. Furthermore, light scattering may differ depending on the type of object and how hard the object is pressed against the touch surface. Likewise, light scattering may differ for different types of contamination, e.g. fingerprints and liquid spills. For example, the pattern of valleys and ridges on a human finger or in a fingerprint may cause irregular scattering of light, as well as interference/diffraction phenomena depending on the coherence of the propagating light.

Figures 11A, 11B, 11C, 11D:
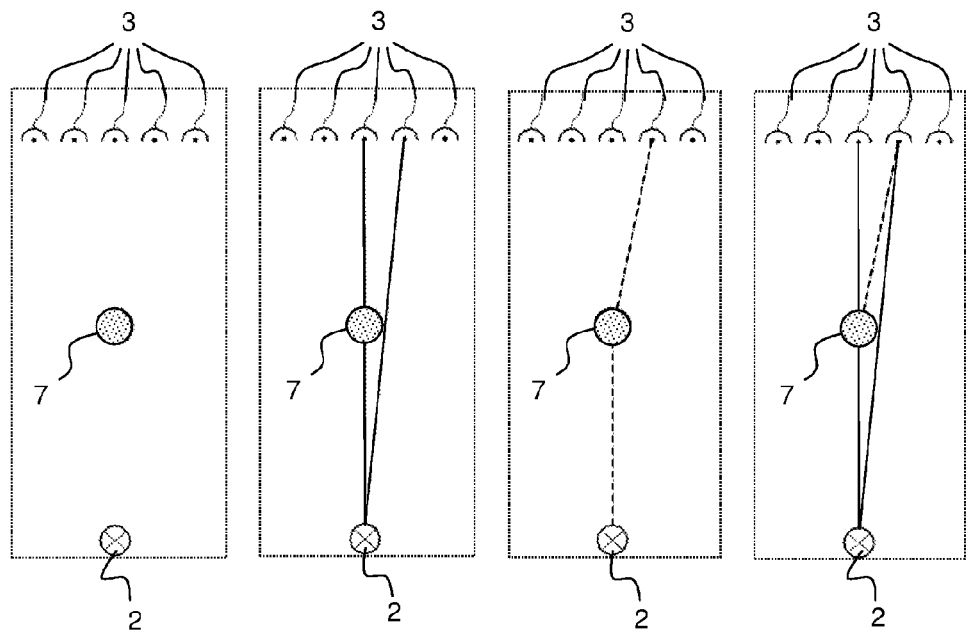
FIGS. 11A-11D are plan views of an FTIR system to illustrate how interferences may be caused by light scattering.

FIGS. 11A-11D illustrate the impact of light scattering on the projection values measured by light sensors 3 in an FTIR system. For the purpose of simplification, the system is illustrated with one light emitter 2 and five light sensors 3. In FIG. 11A, an object 7 is brought into contact with the touch surface. In FIG. 11B, it is assumed that the apparatus is free of dynamic light scattering. The emitter 2 is activated to generate a first and a second detection line. The first detection line passes directly through the contact area between the object 7 and the touch surface, resulting in a decreased projection value (i.e. an increased attenuation). The second detection line passes directly to the right of the contact area and will result in an unchanged projection value (i.e. no attenuation). FIG. 11C illustrate the effect of dynamic light scattering. Some of the light that hits the contact area along is scattered by the object and impinges on the sensor of the second detection line. Thus, as shown in FIG. 11D, the projection value of the second detection line will represent the sum of the propagating light reaching its sensor (FIG. 11B) and the scattered light reaching its sensor (FIG. 11C). This results in an increased projection value (i.e. a decreased attenuation) for the second detection line. The discussion in relation to FIG. 11 is equally applicable when the object 7 is replaced by a local contamination, such as a fingerprint.

If the object 7 in FIG. 11D is now lifted from the touch surface (or equivalently, if the local contamination is at least partly removed), the projection value of the first detection line will increase while the projection value of second detection line will decrease (since the scattered light is removed). Thus, the attenuation for the second detection line will increase, which may result in a positive peak in the resulting pattern that may be erroneously interpreted as a new touch.

Figure 12:
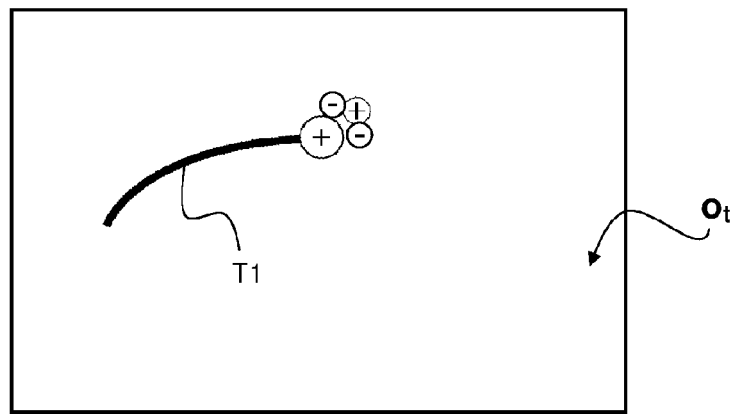
FIG. 12 is a plot of an offset pattern containing a true peak and false peaks caused by light scattering.

It is realized that the dynamic light scattering results in a re-distribution of light energy between detection lines. Typically, but not generally, the dynamic light scattering affects detection lines that pass close to the scattering object/contamination. This will lead to a re-distribution of attenuation in the resulting pattern. Since no new light is created by the light scattering, the sum of the re-distributed attenuation in the pattern should be zero. This means that dynamic light scattering results in both positive and negative peaks in the pattern. These scattering-induced peaks typically emanate as local phenomena around the scattering object/contamination. FIG. 12 is a schematic illustration of a trace T1 overlaid on an offset pattern ($o_t$), which contains peaks that originate from a single touching object. The peaks form a confined group with two positive peaks and two negative peaks, collectively denoted a "quadropole" herein. Such a quadropole may be superimposed on one or more true peaks (positive/negative) that represent the object 7. The true peaks may thereby be at least partly concealed by the quadropole.

4.2 False Peaks Caused by Contamination Changes

When an object is moving along a trajectory on the touch surface, it may change the contamination on the touch surface. For example, if the object is a finger, it may both add finger grease to the touch surface and rearrange existing contamination on the touch surface. Such contamination changes or "residue changes" may be interpreted as peaks in the pattern, even if the pattern is processed to actively compensate for contaminations, e.g. described in the foregoing.

Figure 13A:
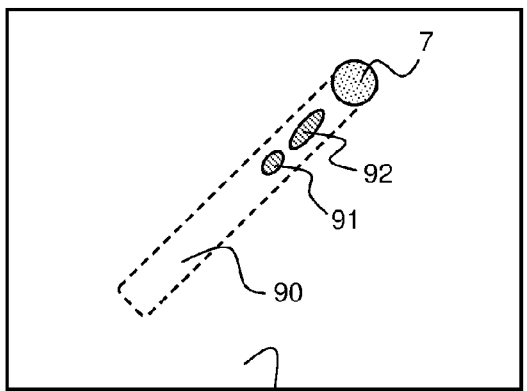
FIGS. 13A-13B are plan views of an FTIR system to illustrate how interferences may be caused by changes in contamination.
Figure 14:
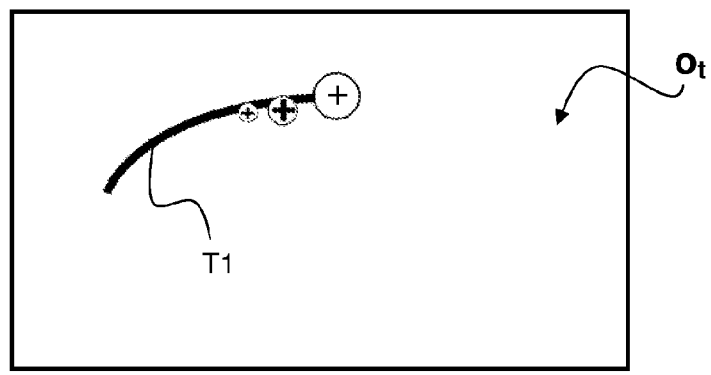
FIG. 14 is a plot of an offset pattern containing a true peak and false peaks caused by changes in contamination.
Figure 15:
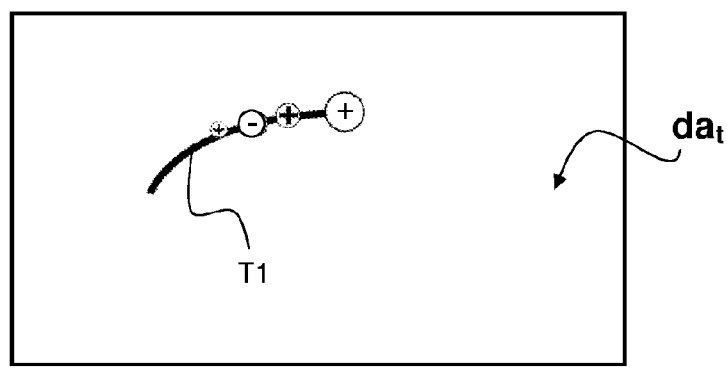
FIG. 15 is a plot of a difference pattern containing true peaks and false peaks caused by changes in contamination.

FIG. 13A is a schematic view of an object 7 on a touch surface 4, where the object has left a trail 90 of contamination as indicated by dashed lines. The attenuation caused by the trail 90 may be estimated and compensated for by existing techniques. However, it may be difficult to fully compensate for the influence of the contaminations, especially if the contaminations are unevenly distributed along and within trail 90. As an example, FIG. 13A indicates two areas 91, 92 in which the contamination is significantly more than expected. Thereby, the areas 91, 92 will result in positive peaks along a movement trajectory in the pattern. This is further illustrated in the offset pattern $o_t$ of FIG. 14, in which two positive peaks caused by locally increased contamination are observed along an existing trace T1 for a single touching object. Similar interference may occur in a difference pattern $da_t$, as illustrated in FIG. 15, where trace T1 contains a positive peak at its front end caused by the movement of the object into a new area on the touch surface during $\Delta t$, a negative peak caused by the movement of the object away from its previous location, and two positive peaks caused by newly added fingerprints that lead to locally increased attenuation.

Figure 13B:
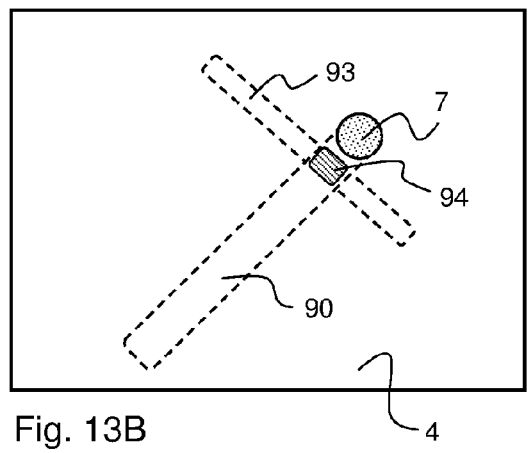

FIG. 13B is a schematic view of an object 7 on a touch surface 4 which has an old trail 93 of contamination thereon. The object 7 has been moved on the surface 4 while wiping away some of the contamination in the trail 93, while depositing a new trail 90 of contamination on the surface 4. If the contamination in trail 93 is not properly estimated when the pattern is generated, the amount of contamination may be either underestimated or overestimated in area 94, resulting in a positive or negative peak along the trace of the object.

4.3 Detection of False Peaks

A potential tracking problem may be identified or forecasted based on detection of potentially false peaks. False peaks may be detected by evaluating detected peaks by a dedicated heuristic which is designed to detect false peaks that are known to occur in a specific way, e.g. the quadropoles, thorus shapes, and contamination peaks as described in the foregoing. Alternatively or additionally, false peaks may be detected by a general heuristic which is designed to detect absurd or at least unlikely manifestations of false peaks in the traces, such as excessive velocities or velocity changes. A few examples of dedicated and general heuristics will now follow.

4.3.1 General Heuristics

The general heuristic may calculate and analyze the velocity and/or acceleration of a trace to decide that a false peak has been matched into the trace. If, for instance, the centripetal velocity and/or centripetal acceleration of a trace is found to be too large, e.g. not humanly possible, a tracking problem may be identified for the trace. Also, the tangential acceleration (especially retardation) and the tangential velocity may indicate a tracking problem.

Figure 16:
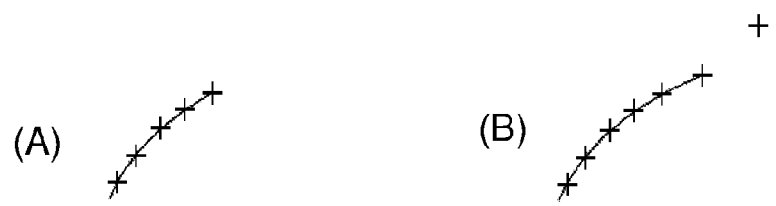
FIGS. 16A-16F illustrate tracking without error suppression.
Figure 16:
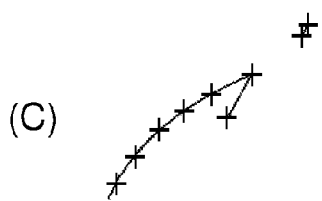
Figure 16:
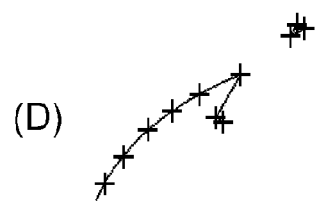
Figure 16:
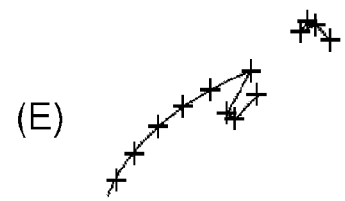
Figure 16:
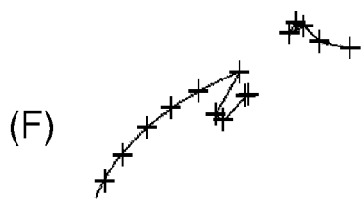

FIG. 16 illustrate how the apparent velocity and acceleration of a trace is affected when false peaks are matched into a trace in conventional tracking. FIG. 16A illustrate a first trace formed by five peaks. In FIG. 16B, the first trace reaches a region with false peaks, e.g. a quadropole, and is matched to one peak, while another peak (false) forms the starting point of a second trace. In FIGS. 16C-16F, the first and second traces are continuously matched to the false peaks that prevail in the attenuation pattern. It is realized that the first trace will exhibit a significant centripetal velocity and acceleration in FIG. 16C, and a significant tangential retardation in FIG. 16D. Either or both of these anomalies may be used to identify a potential tracking problem.

It should be noted that anomalies in velocity and/or acceleration may occur irrespective of the origin of the false peaks. For example, excessive retardation may occur if a large amount of contamination is left behind a moving object to produce a positive peak which is matched into the corresponding trace.

Another general heuristic may analyze the area and/or shape of the detected peaks to identify false peaks.

4.3.2 Dedicated Heuristics

Figure 17:
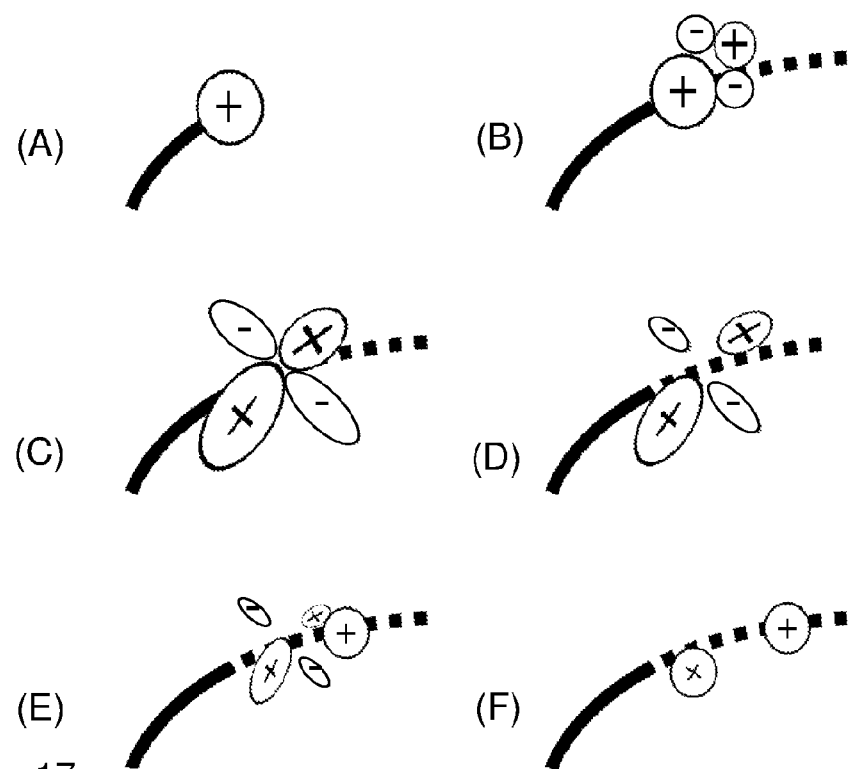
FIGS. 17A-17F illustrate the result of light scattering along a trace as a function of time.

One dedicated heuristic may be designed to identify the above-mentioned quadropoles. FIG. 17 illustrate the temporal evolution of a quadropole which is generated as an object is swept through a contaminated area on the touch surface and thereby causes significant light scattering. The trace is indicated by a solid line which is changed into a dashed line in a problem area. It should be noted that the peaks in the attenuation pattern are a superposition of peaks caused by light scattering, peaks caused by the touching object, and peaks caused by contaminations such as fingerprints. FIGS. 17A and 17B illustrate the trace immediately before and after, respectively, the formation of the quadropole. FIGS. 17C-17E indicate that the quadropole gradually decreases in extent and magnitude as the object passes the problem area. When leaving the problem area, in FIGS. 17E-17F, the object is represented by a positive peak. FIG. 17F also include a false peak on the trace caused by a lasting fingerprint. As seen, the presence of negative peaks in general, and particular outside of the trace, may be an indication of light scattering.

Accordingly, a potential tracking problem may be identified by applying a "scatter heuristic" that includes a first rule stipulating that a positive peak associated with (e.g. located in the vicinity of) one or more negative peaks is to be designated as an uncertain peak. The first rule may be applied to positive peaks located, together with one or more negative peaks, within a search region of given extent. The search region may, e.g. be defined around each negative peak. In a variant, the search region is defined around one or more of the positive peaks, e.g. the positive peak that has been matched to the trace in FIG. 17B. The extent of the search region may be set in dependence of the design of the FTIR system, the reconstruction function and the maximum conceivable size of the scattering object/contamination. In one non-limiting example, the search region is set to a diameter in the range of 1-50 mm. In an alternative, the positive peaks associated with negative peaks are identified by searching the peaks for specific spatial combinations of positive and negative peaks, e.g. by template matching. Such template matching may be scale and/or rotation independent, or may factor in attenuation strength, size, shape, etc of the individual peaks.

As described above, a difference pattern may present negative peaks that do not originate from interferences, but occur naturally along the movement trajectory (trace) of a touching object (cf. FIGS. 3B and 15). Thus, when operating on difference patterns, the first rule may, but need not, be modified to stipulate that positive peaks are to be designated as uncertain peaks only if the associated negative peak (or peaks) is (are) spatially separated from the current traces. Such a modified first rule may also be applied to offset patterns, which may present similar negative peaks, e.g. caused by delayed or incomplete contamination compensation.

In a further variant, the scatter heuristic may include a second rule that all negative peaks are to be designated as uncertain peaks, so as to prevent negative peaks from being introduced into the trace history list. However, the skilled person realizes that there are other ways of excluding negative peaks, e.g. to exclude the use of all negative peaks in the matching and updating step 54 (FIG. 5A).

The scatter heuristic will reduce the likelihood that peaks caused by scatter phenomena are identified as indicative of touching objects. Furthermore, the scatter heuristic may serve to suppress the influence of peaks that originate from other types of interference.

Another dedicated heuristic may be designed to identify the above-mentioned torus shapes, e.g. by template matching or any technique for detecting ring-shaped formations such as fuzzy clustering, Hough transformation, etc.

Yet another dedicated heuristic may be designed to identify contamination-induced positive peaks. This "contamination heuristic" may include a first rule stipulating that a positive peak is to be designated as uncertain if it is located along an existing trace. The contamination heuristic may contain a second rule that stipulates that such a positive peak is to be designated as uncertain only if it is non-matched to existing traces. The second rule will allow the method to track a touch that crosses another trace, since matched peaks are not identified by the contamination heuristic. It is conceivable that the contamination heuristic also includes a third rule that stipulates that the positive (matched or non-matched) peak is to be designated as an uncertain peak only if it is located within a maximum distance from the front end of the existing trace. The third rule may reduce the risk that new touches that occur in existing traces are designated as uncertain peaks and prevented from being added to the trace history list. Since contamination-induced peaks are likely to occur relatively close to the front end of the trace, the third rule may be used without introducing false peaks into the trace history list. The maximum distance used in the third rule may be a Euclidian distance or a distance along the trace. In one implementation, the maximum distance is a fixed, absolute distance. In another implementation, the maximum distance is set dynamically as a function of the trace velocity, such that a higher trace velocity results in a larger maximum distance. This will ensure that the contamination-induced peaks are designated as uncertain also for objects move quickly across the touch surface. In one example, the maximum distance is an extent along the trace, from its current position to its previous position a given number of frames back in time, e.g. 5, 10 or 20 frames. Thereby, the positive peak will be designated as uncertain only if it falls within the recent trajectory of the trace, where the extent of the recent trajectory automatically scales with the velocity of the trace.

5. Example of Tracking Method

Figure 18:
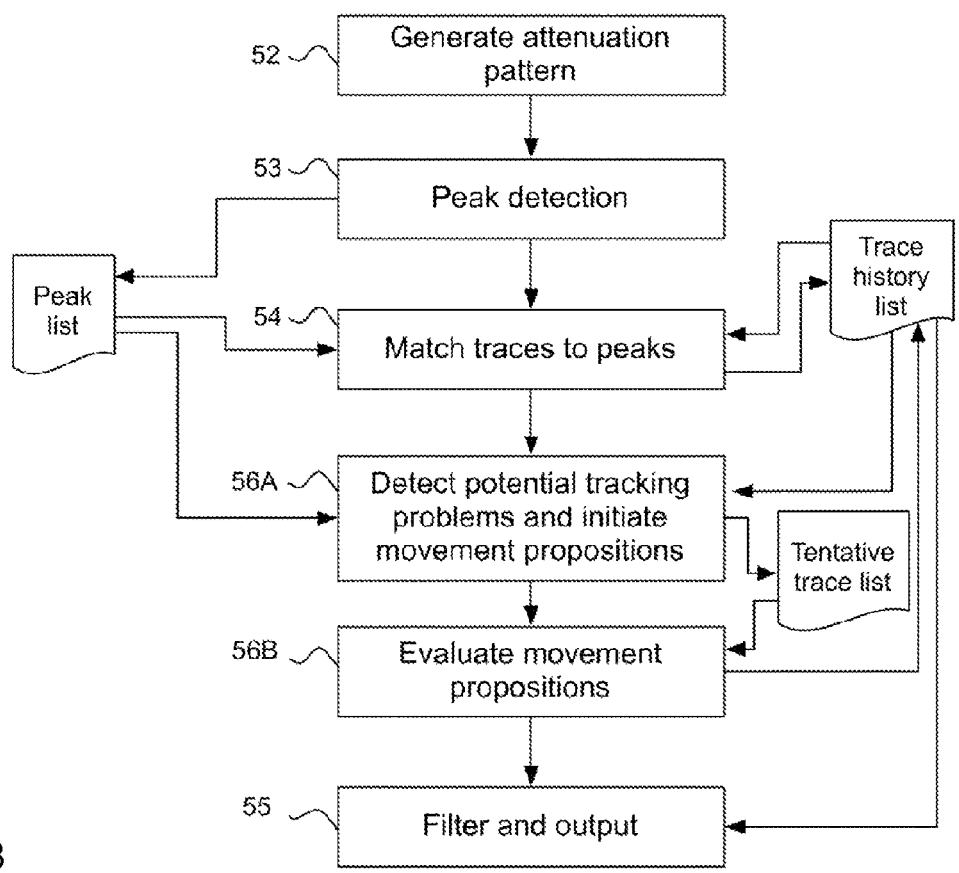
FIG. 18 is a flow chart of a method for tracking objects according to another embodiment of the invention.

FIG. 18 is a flowchart of an embodiment of the tracking method and illustrates how different steps in a single frame operate to populate different data structures. Following the generation of the attenuation pattern in step 52 (cf. FIG. 5A), the peak detection step 53 detects all relevant peaks, both positive and negative, and stores information about the peaks in a peak list. The content of the peak list is thus related to the current frame. Then, step 54 operates to match existing traces in the trace history list to the positive peaks in the peak list. The outcome of the matching is used for updating the trace history list, by adding current data to existing traces, while removing lost traces and adding new traces. The trace history list is thus updated with trace information across several frames. The next step 56A detects potential tracking problems, e.g. by applying one or more of the above-identified heuristics. If a potential tracking problem is found for one or more traces, two or more movement propositions are initiated for each implicated trace and corresponding information is stored in a tentative trace list. The tentative trace list is thus updated with information related to one or more of the movement propositions of each implicated trace across several frames (within the above-mentioned evaluation period $\Delta t_1$). The following step 56B evaluates the movement propositions and chooses, if possible, one of the movement propositions for one or more of the implicated traces in the tentative trace list. The trace history list is then updated with the chosen movement proposition for the implicated trace. Step 56B typically operates on movement propositions that are added to the tentative trace list in preceding frames. Step 55 then outputs a best guess of all or a subset of the traces in the trace history list, and may also output data representing all or a subset of the implicated traces. There are many ways of handling the implicated traces. In one example, step 55 may output touch data according to one of the propositions, e.g. the move proposition or the stop proposition, and then switch (if needed) to the movement proposition eventually chosen by step 56B.

The illustrated data structures are merely examples. For example, the trace history list and the tentative trace list may be combined into a common data structure.

Figure 19:
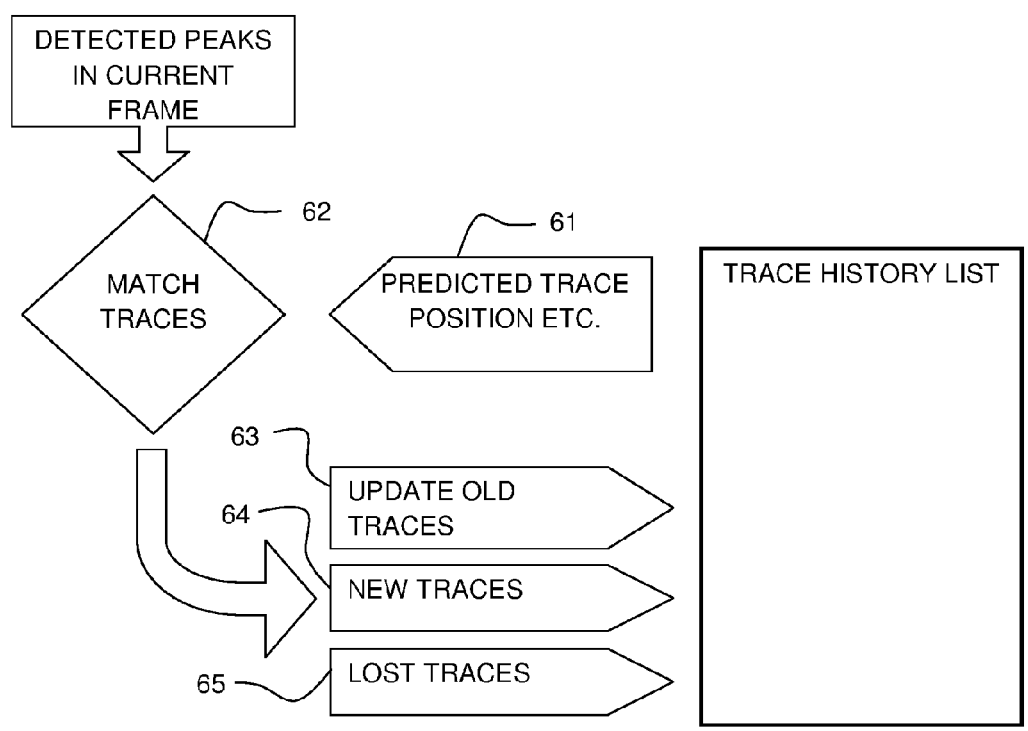
FIG. 19 illustrates a process of maintaining a trace history list in the method of FIG. 18.

Step 54 may been seen as a process of maintaining the trace history list. FIG. 19 gives a detailed example of such a maintaining process, which aims at, based on matches between current peaks (detected in step 53) and traces in the trace history list, update the trace history list with current trace parameter values.

In step 61, the trace parameter values for the traces in the trace history list are processed for generating predicted values for the current frame. Depending on implementation, step 61 may operate to predict the most likely location (coordinates), size and shape for all traces in the trace history list. Step 61 may be omitted, but is currently believed to improve the quality of the distance measures when computing match values (below).

In step 62, the (predicted) values of the trace parameters are matched against corresponding parameter values for the peaks in the peak list. Thereby, a match value is computed between every peak and every trace in the trace history list. The match value indicates the likelihood of a match between the peak and a specific trace. The match value may, e.g., be computed as a function of the Euclidian distance between the location of the peak and the (predicted) location of the trace, and/or as a function of a similarity in size and/or shape and/or attenuation strength. Also, invalid match values may be set for peak-trace combinations that are deemed impossible. One limitation for peak-trace combinations may be given by a maximum distance between the (predicted) location of the peak and the location of the trace. In one example, a match is deemed impossible if the distance is greater than 15 mm. Imposing restrictions on allowed peak-trace combinations also makes it possible to use smarter algorithms for the match value computations, for example a hierarchical search over the touch surface. It is to be understood that the match values may be computed to factor in further trace parameters included in the trace history list, e.g. the age of the trace.

In a total pattern and an offset pattern, a touching object is represented by a positive peak. For such attenuation patterns, step 62 may ignore all negative peaks, i.e. only positive peaks are matched against existing traces. In a difference pattern, a touching object may be represented by both a positive and a negative peak, and step 62 may match either positive peaks or negative peaks, or a combination thereof, against existing traces.

In step 62, the identified peaks are also assigned (i.e. matched) into the trace history list based on the match values, so as to determine one trace (if any) as a best match for each peak. A simple way to do this assignment, if the match values are calculated to represent a better match by a higher match value, is to start with the highest match value and proceed to gradually lower match values (a greedy approach), and vice versa if a better match is represented by a lower match value. There are many other and more elaborate algorithms for making this assignment, such as Hungarian method (Kuhn's algorithm) or any other algorithm solving bipartite matching based on match values. In an alternative, the assignment accounts for the age of the trace associated with the respective match value, e.g. by starting with the oldest match value/trace (largest value of age parameter) and proceeding to gradually younger match values/traces.

After step 62, each peak is either assigned to an existing trace ("matched peak") or is identified as lacking an assigned trace ("non-matched peak"). Likewise, each existing trace is either assigned to a peak or is identified as lacking an association ("non-matched trace").

In step 63, the trace history list is updated for all matched peaks, by updating the corresponding trace parameters as a function of the peak parameter values for the matched peak or peaks.

In step 64, non-matched peaks are interpreted as new traces and are added to the trace history list Like in step 63, the trace parameter values may be given by, or calculated as a function of, the peak parameter values.

In step 65, non-matched traces are interpreted as lost traces and are removed from the trace history list. In one variant, the removal of such a trace is delayed for a few (e.g. 1-10) frames to make it possible to find peaks belonging to the trace in a later frame. This may e.g. avoid removal of weak traces that may be temporarily hidden in noise or artifacts. In another variant, non-matched traces are removed if one or more trace parameter values fulfils a given criterion, e.g. if the local noise has decreased below what is expected, or if the attenuation strength of a trace has decreased rapidly over a sequence of preceding frames (which may indicate that the corresponding object is being lifted from the touch surface).

The tracking method according to the various embodiments disclosed herein may be implemented by a data processing device (cf. 10 in FIG. 1) which is connected to sample measurement values from the light sensors 3 in the FTIR system. FIG. 5B shows an example of such a data processing device 10, which includes an input 102A for receiving the output signal. The device 10 further includes a data collection element (or means) 200 for obtaining the current projection values, a conversion element (or means) 201 for converting the current projection values into current input values or change values, a pattern generation element (or means) 202 for generating a current attenuation pattern, a peak detection element (or means) 203 for detecting peaks in the current attenuation pattern, an error suppression element (or means) 204 for identifying potential tracking problems, defining movement propositions and causing subsequent evaluation of the movement propositions, an updating element (or means) 205 for updating the trace history list, an outputting element (or means) 206 for providing current touch data for output, and an output 102B for outputting the current touch data.

The device 10 may be implemented by special-purpose software (or firmware) run on one or more general-purpose or special-purpose computing devices. In this context, it is to be understood that each "element" or "means" (or equivalently, "module") of such a computing device refers to a conceptual equivalent of a method step; there is not always a one-to-one correspondence between elements/means and particular pieces of hardware or software routines. One piece of hardware sometimes implements different means/elements. For example, a processing unit may serve as one element/means when executing one instruction, but serve as another element/means when executing another instruction. Naturally, it is conceivable that one or more elements (means) are implemented entirely by analog hardware components.

The software controlled device 10 may include one or more processing units (cf. 14 in FIG. 1B), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the trace history list and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, it is conceivable to implement the tracking process to use a combination of the predictive and reactive approaches, so as to further suppress the impact of tracking problems.

Further, the format of the input values $s_t$ depends on (or is given by) the reconstruction function $\mathcal{P}'$ and the desired/ required accuracy of the reconstructed pattern. In alternative implementations, the format may e.g. be given as a transmission (e.g. given by the projection value normalized by the reference value), an energy difference (e.g. given by the difference between the projection value and the reference value), or a logarithm of the energy difference. As used hereinabove, a "logarithm" is intended to also encompass functions approximating a true logarithmic function, in any base. Furthermore, the input values may have any sign, i.e. they may or may not be multiplied by a negative value. Depending on the reconstruction function, it may even be possible to use the projection values as input values. Similar modifications may be made with respect to the generation of the difference pattern. Thus, on a more general level, the above-mentioned total, offset and difference patterns may be regarded as "interaction patterns" that comprise a distribution of changes in local interaction with propagating light caused by one or more touching objects.

The invention claimed is:

1. A method of tracking movement of one or more objects on a touch surface of a touch-sensitive apparatus, the touch-sensitive apparatus being operable to propagate light by internal reflections inside a light transmissive panel from a plurality of incoupling points to a plurality of outcoupling points so as to illuminate the touch surface from within the light transmissive panel, wherein at least one light detector is optically coupled to the outcoupling points to generate an output signal representing received light at the outcoupling points, wherein the method operates in a time sequence of repetitions, each repetition comprising:
   processing the output signal to generate an interaction pattern that indicates local changes in interaction on the touch surface; processing the interaction pattern for identification of apparent peaks; and updating, based on the apparent peaks, existing movement trajectories of objects deemed to exist on the touch surface in a preceding repetition;
   wherein said method further comprises an error suppression process which is executed at least intermittently in said time sequence of repetitions and which comprises:
   processing the apparent peaks and/or the existing movement trajectories to identify implicated trajectories with a potential tracking problem;
   defining at least two movement propositions for each implicated trajectory; and
   causing an evaluation of said at least two movement propositions in one or more subsequent repetitions.

2. The method of claim 1, wherein said evaluation results in a selection of one of said at least two movement propositions for each implicated trajectory.

3. The method of claim 2, wherein the step of updating the existing movement trajectories comprises updating each implicated trajectory based on the selection.

4. The method of claim 1, wherein the implicated trajectories are identified by processing the apparent peaks to identify potentially false peaks, and mapping the potentially false peaks to the existing movement trajectories.

5. The method of claim 1, wherein said at least two movement propositions comprise a first proposition that the object corresponding to the implicated trajectory is stationary, and a second proposition that the object corresponding to the implicated trajectory is moving.

6. The method of claim 5, wherein the second movement proposition dictates that the object continues to move along a predicted trajectory during a first evaluation time period.

7. The method of claim 6, wherein the step of defining said at least two movement propositions comprises: generating the predicted trajectory as a function of the implicated trajectory.

8. The method of claim 6, wherein said evaluation comprises: matching at least part of the apparent peaks identified in the first evaluation time period to the predicted trajectory.

9. The method of claim 6, wherein the step of updating comprises matching at least part of the apparent peaks to the existing movement trajectories; wherein said error suppression process further comprises: preventing said matching of said at least part of the apparent peaks to the implicated trajectory during a second evaluation time period.

10. The method of claim 9, wherein the error suppression process further comprises: defining uncertainty areas around the implicated trajectories in the interaction pattern during the second evaluation time period, and preventing, during the second evaluation time period, the step of updating from operating on the apparent peaks that are located in the uncertainty areas.

11. The method of claim 5, wherein the step of updating comprises identifying and adding new movement trajectories to the existing movement trajectories, and wherein said evaluation comprises matching candidates of said new movement trajectories to the implicated trajectory.

12. The method of claim 11, wherein said matching is a function of at least one of: an estimated direction of origin of said candidates and a distance between the implicated trajectory and a current location of said candidates.

13. The method of claim 11, wherein the error suppression process further comprises: defining uncertainty areas around the implicated trajectories in the interaction pattern during a second evaluation time period, so as to prevent new movement trajectories from being identified in the uncertainty areas.

14. The method of claim 1, wherein said at least two movement propositions comprise a first proposition that the object corresponding to the implicated trajectory is removed from the touch surface, and a second proposition that the object corresponding to the implicated trajectory is moving.

15. The method of claim 14, wherein the potential tracking problem is identified when a plurality of positive peaks are deemed to form a ring-shape in the interaction pattern.

16. The method of claim 1, wherein the potential tracking problem is caused by at least one of light scattering on the touch surface, and a change in contamination on the touch surface.

17. The method of claim 1, wherein said at least two movement propositions may be defined, in the step of defining, based on a classification of the potential tracking problem and/or based on a movement characteristic of the implicated trajectory during preceding repetitions.

18. A non-transitory computer program product comprising computer code which, when executed on a data-processing system, is adapted to carry out the method of claim 1.

19. A device for tracking movement of one or more objects on a touch surface of a touch-sensitive apparatus, the touch-sensitive apparatus being operable to propagate light by internal reflections inside a light transmissive panel from a plurality of incoupling points to a plurality of outcoupling points so as to illuminate the touch surface from within the light transmissive panel, wherein a light sensing means is optically coupled to the outcoupling points to generate an output signal representing received light at the outcoupling points, wherein the device comprises:
   an input for the output signal;
   and a signal processor configured to operate in a time sequence of repetitions, each repetition comprising:
   processing the output signal to generate an interaction pattern that indicates local changes in interaction on the touch surface; processing the interaction pattern for identification of apparent peaks; and updating, based on the apparent peaks, existing movement trajectories of objects deemed to exist on the touch surface in a preceding repetition;

said device further comprising an error suppression module configured to operate at least intermittently in said time sequence of repetitions by:

processing the apparent peaks and/or the existing movement trajectories to identify implicated trajectories with a potential tracking problem;

defining at least two movement propositions for each implicated trajectory; and causing an evaluation of said at least two movement propositions in one or more subsequent repetitions.

20. A touch-sensitive apparatus, comprising:

a light transmissive panel configured to propagate light by internal reflections from a plurality of incoupling points to a plurality of outcoupling points so as to illuminate the touch surface from within the light transmissive panel;

means for providing the light at the incoupling points;

means for generating an output signal representing received light at the outcoupling points; and the device for tracking movement of one or more objects according to claim 19.

* * * * *